US011497267B2

(12) United States Patent
Koh et al.

(10) Patent No.: US 11,497,267 B2
(45) Date of Patent: *Nov. 15, 2022

(54) SYSTEMS AND METHODS FOR FULL BODY MEASUREMENTS EXTRACTION

(71) Applicant: Bodygram, Inc., Las Vegas, NV (US)

(72) Inventors: Chong Jin Koh, Las Vegas, NV (US); Yu Sato, Kawasaki (JP)

(73) Assignee: Bodygram, Inc., Las Vegas, NV (US)

( * ) Notice: Subject to any disclaimer, the term of this patent is extended or adjusted under 35 U.S.C. 154(b) by 205 days.

This patent is subject to a terminal disclaimer.

(21) Appl. No.: 15/733,770

(22) PCT Filed: Apr. 15, 2019

(86) PCT No.: PCT/US2019/027564
§ 371 (c)(1),
(2) Date: Oct. 20, 2020

(87) PCT Pub. No.: WO2019/204235
PCT Pub. Date: Oct. 24, 2019

(65) Prior Publication Data
US 2021/0235802 A1    Aug. 5, 2021

Related U.S. Application Data

(63) Continuation of application No. 16/195,802, filed on Nov. 19, 2018, now Pat. No. 10,321,728.

(Continued)

(51) Int. Cl.
*G06V 40/10*    (2022.01)
*A41H 1/02*     (2006.01)
(Continued)

(52) U.S. Cl.
CPC ............... *A41H 1/02* (2013.01); *G06N 20/00* (2019.01); *G06T 7/143* (2017.01); *G06T 11/203* (2013.01);
(Continued)

(58) Field of Classification Search
CPC .......... A41H 1/02; G06N 20/00; G06N 20/20; G06N 20/10; G06N 3/126; G06N 3/0454;
(Continued)

(56) References Cited

U.S. PATENT DOCUMENTS

| 5,956,525 A | 9/1999 | Minsky |
|---|---|---|
| 6,490,534 B1 | 12/2002 | Pfister |

(Continued)

FOREIGN PATENT DOCUMENTS

| CN | 107194987 A | 9/2017 |
|---|---|---|
| WO | WO2011142655 A2 | 11/2011 |
| WO | WO2014076633 A1 | 5/2014 |

OTHER PUBLICATIONS

Simmons, Karla P., and Cynthia L. Istook. "Body measurement techniques: Comparing 3D body-scanning and anthropometric methods for apparel applications." Journal of Fashion Marketing and Management: An International Journal 7, No. 3 (2003): 306-332. (Year: 2003).

(Continued)

*Primary Examiner* — Carol Wang
(74) *Attorney, Agent, or Firm* — American Patent Agency PC; Daniar Hussain; Stephen M. Hou

(57) ABSTRACT

Disclosed are systems and methods for full body measurements extraction using a mobile device camera. The method includes the steps of receiving one or more user parameters; receiving at least one image containing the human and a background; identifying one or more body features associated with the human; performing body feature annotation on the identified body features for generating an annotation line on each body feature corresponding to a body feature measurement, the body feature annotation utilizing an annotation deep-learning network that has been trained on annotation training data, the annotation training data comprising one or more images for one or more sample body features (Continued)

and an annotation line for each body feature; generating body feature measurements from the one or more annotated body features utilizing a sizing machine-learning module based on the annotated body features and the one or more user parameters; and generating body size measurements by aggregating the body feature measurements for each body feature.

20 Claims, 17 Drawing Sheets

Related U.S. Application Data

(60) Provisional application No. 62/660,377, filed on Apr. 20, 2018.

(51) Int. Cl.
*G06T 7/143* (2017.01)
*G06T 17/10* (2006.01)
*G06N 20/00* (2019.01)
*G06T 11/20* (2006.01)

(52) U.S. Cl.
CPC ............ *G06T 17/10* (2013.01); *G06V 40/103* (2022.01); *G06T 2207/30196* (2013.01)

(58) Field of Classification Search
CPC .......... G06N 3/08; G06N 5/003; G06N 5/048; G06N 7/005; G06T 11/203; G06T 11/00; G06T 17/10; G06T 2200/24; G06T 2207/10004; G06T 2207/20081; G06T 2207/20084; G06T 2207/20104; G06T 2207/30196; G06T 7/11; G06T 7/62; G06T 7/73; G06T 7/143; G06V 40/103
See application file for complete search history.

(56) References Cited

U.S. PATENT DOCUMENTS

| | | |
|---|---|---|
| 7,987,111 B1 | 7/2011 | Sharma |
| 9,189,886 B2 | 11/2015 | Black et al. |
| 9,292,967 B2 | 3/2016 | Black et al. |
| 9,400,925 B2 | 7/2016 | Bourdev |
| 9,623,578 B1 | 4/2017 | Aminpour et al. |
| 9,858,719 B2 | 1/2018 | Dorner et al. |
| 2013/0315475 A1 | 11/2013 | Song et al. |
| 2014/0270540 A1 | 9/2014 | Spector et al. |
| 2014/0277663 A1 | 9/2014 | Gupta et al. |
| 2015/0154453 A1 | 6/2015 | Wilf |
| 2015/0186748 A1 | 7/2015 | Cootes et al. |
| 2017/0273639 A1 | 9/2017 | Iscoe et al. |
| 2018/0047192 A1 | 2/2018 | Kristal |
| 2018/0350148 A1 | 12/2018 | George |

OTHER PUBLICATIONS

Proper Cloth LLC, "Proper Cloth, Design the perfect shirt" webpage, Available at: https://propercloth.com/design-a-shirt/, last accessed on Apr. 10, 2017.

Bit Body, Inc., MTailor webpage and mobile application, Available at: https://www.mtailor.com/, last accessed on Apr. 10, 2017.

AFT GmbH, "Tailor4less" webpage, Available at: https://www.tailor4less.com/en/men/custom-dress-shirts/, last accessed on Apr. 10, 2017.

Flex Japan Corporation, "Karuizawa shirt" webpage, Available at: http://karuizawa-shirt.jp/builder, last accessed on Apr. 10, 2017 with Google Translate.

3DLook Inc., "3D body scanning in the palm of your hand" webpage, Available at: https://3dlook.me/3dlook-technology/, last accessed on Oct. 9, 2018.

Agisoft, "PhotoScan—photogrammetric processing of digital images and 3D spatial data generation" webpage, Available at: http://www.agisoft.com, last accessed on Oct. 9, 2018.

Gabriel L. Oliveira, et al., "Deep Learning for Human Part Discovery in Images," 2016 IEEE International Conference on Robotics and Automation (ICRA), May 16-21, 2016, Stockholm, Sweden. DOI: 10.1109/ICRA.2016.7487304.

Alexander Toshev and Christian Szegedy, "DeepPose: Human Pose Estimation via Deep Neural Networks," IEEE Conference on Computer Vision and Pattern Recognition, 2014. DOI: 10.1109/CVPR.2014.214.

Gul Varol, et al., "BodyNet: Volumetric Inference of 3D Human Body Shapes," European Conference on Computer Vision 2018 (ECCV 2018), 27 pages. arXiv:1804.04875.

Stefanie Wuhrer, et al., "Estimation of Human Body Shape and Posture Under Clothing," Computer Vision and Image Understanding, 127, pp. 31-42, 2014. DOI: 10.1016/j.cviu.2014.06.012.

Alexandru Balan and Michael J. Black, "The Naked Truth: Estimating Body Shape Under Clothing." In: D. Forsyth, P. Torr, and A. Zisserman (Eds.), Computer Vision—ECCV 2008, Lecture Notes in Computer Science, vol. 5303. Springer, Berlin, pp. 15-29, 2008. DOI: https://doi.org/10.1007/978-3-540-88688-4_2.

Masahiro Sekine, et al., "Virtual Fitting by Single-Shot Body Shape Estimation," 5th International Conference on 3D Body Scanning Technologies, Lugano, Switzerland, pp. 406-413, Oct. 21-22, 2014. DOI: 10.15221/14.406.

Hengshuang Zhao, et al., "Pyramid Scene Parsing Network," CVPR 2017, Dec. 4, 2016, Available at: arXiv:1612.01105.

Leo Breiman, "Random Forests," Machine Learning, 45, 5-32, 2001, Kluwer Academic Publishers, Netherlands, Available at: https://doi.org/10.1023/A:1010933404324.

Krinninger, Thomas. "One-Shot 3D Body-Measurement," Master's Thesis, Graz University of Technology, Graz, Austria, Oct. 2016.

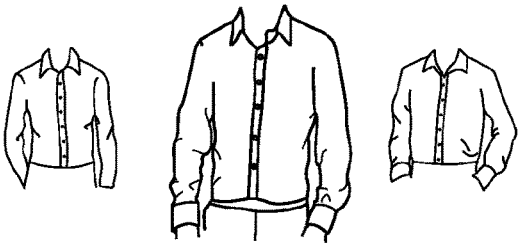
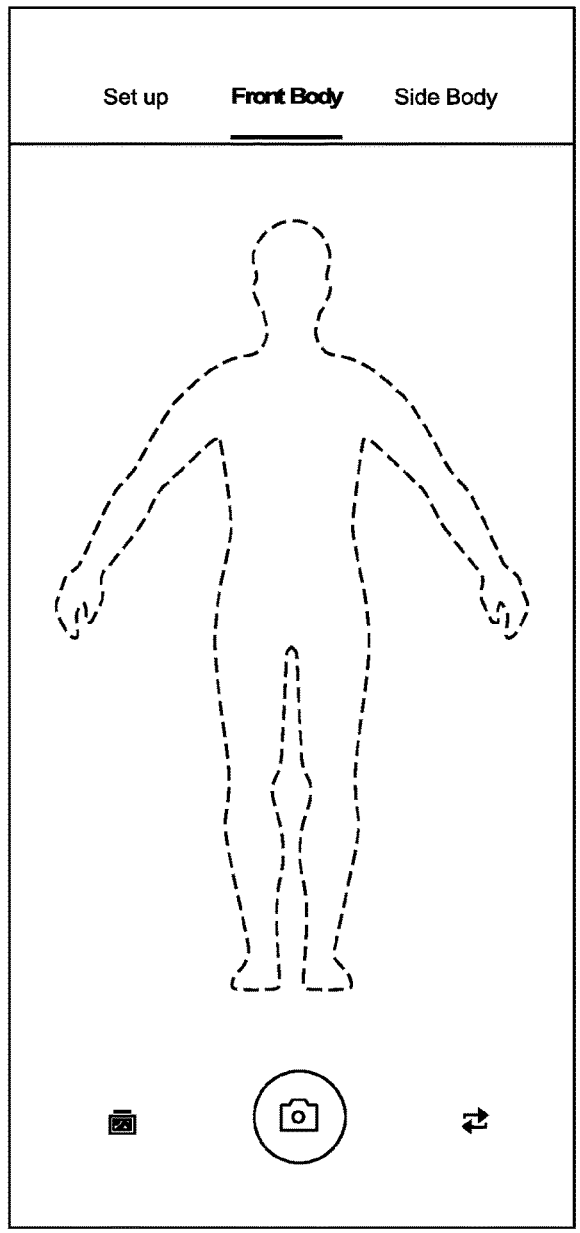
FIG. 16  FIG. 17

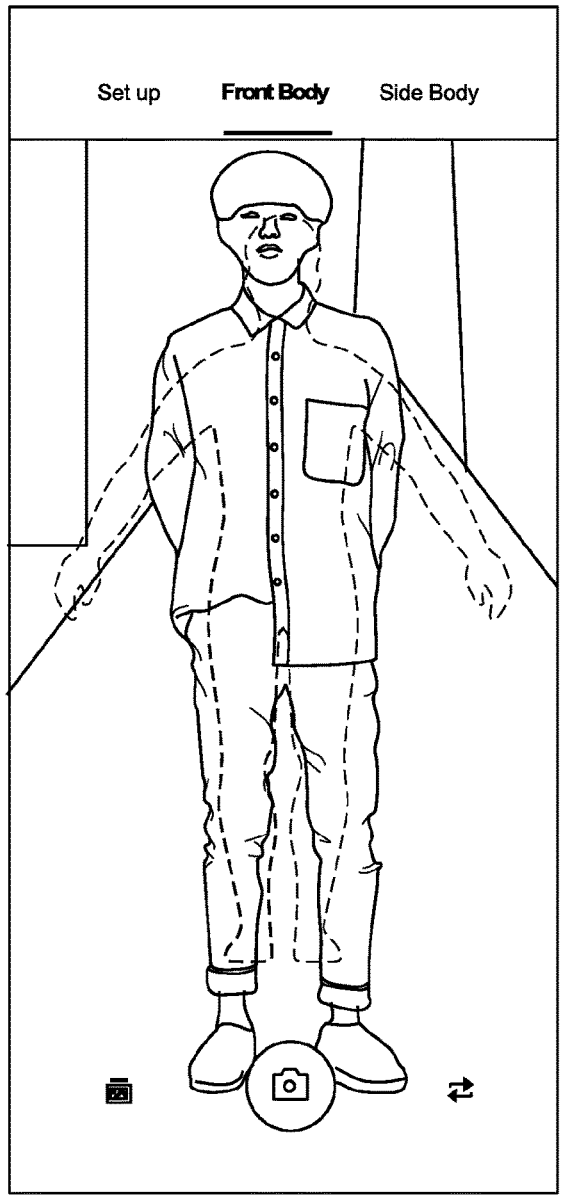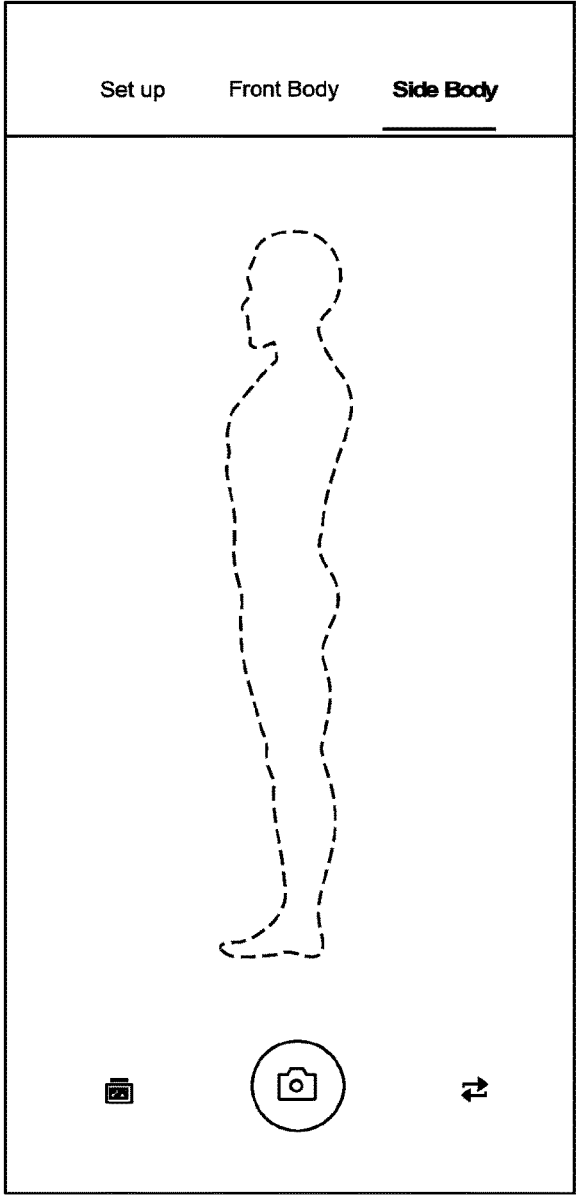
FIG. 18  FIG. 19

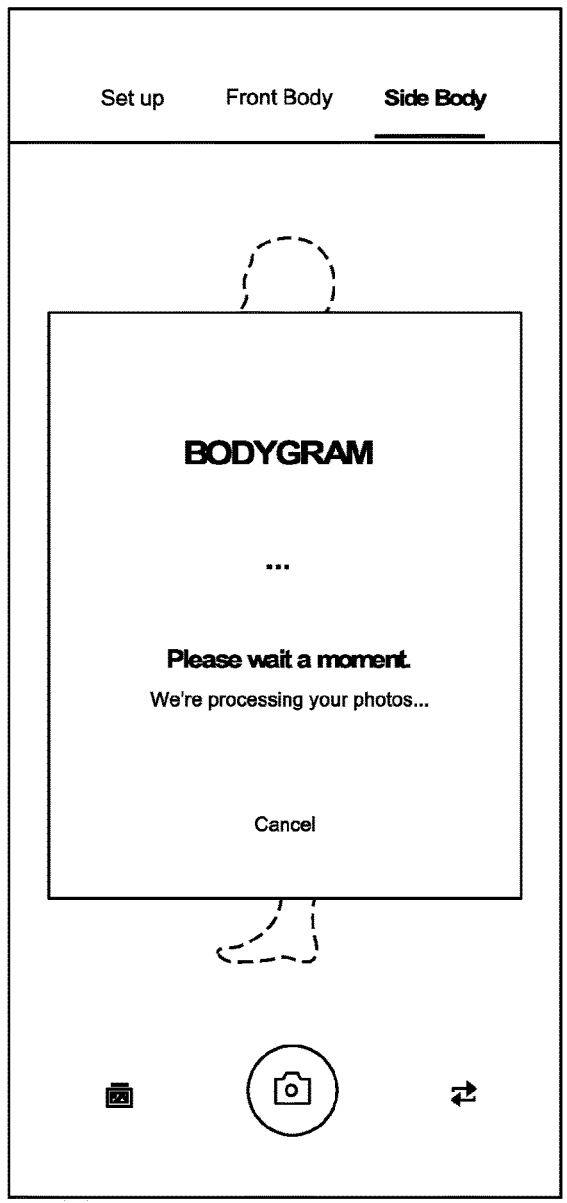
FIG. 20  FIG. 21

US 11,497,267 B2

SYSTEMS AND METHODS FOR FULL BODY MEASUREMENTS EXTRACTION

REFERENCE TO PRIORITY APPLICATIONS

This application claims priority under the Patent Cooperation Treaty (PCT) to U.S. Ser. No. 16/195,802, filed on 19 Nov. 2018, entitled "Systems and methods for full body measurements extraction," and to U.S. Ser. No. 62/660,377, filed on 20 Apr. 2018, entitled "Systems and methods for full body measurements extraction using a 2D phone camera."

FIELD OF THE INVENTION

Embodiments of the present invention are in the field of automated body measurements, and pertain particularly to extracting body measurements of users using photos taken with a mobile device.

BACKGROUND OF THE INVENTION

The statements in the background of the invention are provided to assist with understanding the invention and its applications and uses, and may not constitute prior art.

There are generally three approaches that have been tried to generate or extract body measurements from images of users. A first approach was to use 3D cameras that provide depth data, such as MICROSOFT KINECT camera. With depth sensing, 3D body models can be built to capture body sizing. However, not everyone has access to 3D cameras, and since there is no clear path to mass adoption at the moment, it is not currently conceivable that such 3D cameras become ubiquitous.

A second approach was to use 2D cameras to capture 2D videos, and make use of 2D-to-3D reconstruction techniques to recreate 3D body models to capture body sizing. Such a technique is used by companies such as MTAILOR and 3DLOOK. In the 2D video approach, a 3D body model is recreated, and the approach attempts to perform a "point cloud matching technique" to match an existing 3D body template with a pre-filled point cloud onto the newly created 3D body. However, the result may not be accurate when trying to fit an existing template onto a unique user's 3D body. After the matching of the template 3D body with the user's 3D body is completed, sizing and measurements are obtained, but they are generally not accurate.

A third approach was to use 2D cameras to capture 2D photos instead of 2D videos, and similar to the previous method, utilize 2D-to-3D reconstruction techniques to capture body sizing. Such a technique is used by AGISOFT, for example, a company that has developed 3D reconstructions from 2D photos into 3D models. Using 2D photos, instead of 2D videos, may involve photos captured at a higher resolution, thus producing results with slightly higher accuracy, but the other aforementioned problems remain.

In the existing methods using 2D videos or photos, 3D body models are generated, and these approaches generally require the user to have specific poses, stand at a specific distance from the camera, in front of an empty background, wear tight fitting clothing, and/or be partially nude wearing only underwear. Such requirements for controlled environments and significant user frictions are undesirable.

Therefore, it would be an advancement in the state of the art to provide a system and method for accurately extracting body measurements from 2D photos with 1) the user in any pose, 2) the user standing in front of any background type, 3) the photos taken at any distance, and 4) the user wearing any type of clothing, such that everyone can easily take photos of themselves and benefit from full body measurement extraction.

It is against this background that the present invention was developed.

BRIEF SUMMARY OF THE INVENTION

The present invention relates to methods and systems for extracting full body measurements using 2D user images, taken for example from a mobile device camera.

More specifically, in various embodiments, the present invention is a computer-implemented method for generating body size measurements of a human, the computer-implemented method executable by a hardware processor, the method comprising steps of receiving one or more user parameters; receiving at least one image containing the human and a background; identifying one or more body features associated with the human; performing body feature annotation on the identified body features for generating an annotation line on each body feature corresponding to a body feature measurement, the body feature annotation utilizing an annotation deep-learning network that has been trained on annotation training data, the annotation training data comprising one or more images for one or more sample body features and an annotation line for each body feature; generating body feature measurements from the one or more annotated body features utilizing a sizing machine-learning module based on the annotated body features and the one or more user parameters; and generating body size measurements by aggregating the body feature measurements for each body feature.

In an embodiment, the identifying the one or more body features associated with the human step comprises performing body segmentation on the at least one image to identify the one or more body features associated with the human from the background, the body segmentation utilizes a segmentation deep-learning network that has been trained on segmentation training data, and the segmentation training data comprise one or more images for one or more sample humans and a body feature segmentation for each body feature for the one or more sample humans.

In an embodiment, the body feature segmentation is extracted underneath clothing, and the segmentation training data comprises body segmentation estimating the human's body underneath the clothing by an annotator.

In an embodiment, the annotation line on each body feature comprises one or more line segments corresponding to a given body feature measurement, and the generating the body feature measurements from the one or more annotated body features utilizes the annotation line on each body feature.

In an embodiment, the at least one image comprises at least a front-view image and a side-view image of the human, and the method further comprises the following steps after the performing body feature annotation step: calculating at least one circumference of at least one annotated body feature utilizing line-annotated front-view and side-view images and a height of the human; and generating the body feature measurements from the at least one circumference utilizing the sizing machine-learning module based on the at least one circumference, the height, and the one or more user parameters.

In an embodiment, the sizing machine-learning module comprises a random forest algorithm, and the sizing machine-learning module is trained on ground truth data comprising one or more sample body size measurements for one or more sample humans.

In an embodiment, the one or more user parameters are selected from the group consisting of a height, a weight, a gender, an age, and a demographic information.

In an embodiment, the receiving the one or more user parameters comprises receiving user input of the one or more user parameters through a user device.

In an embodiment, the receiving the one or more user parameters comprises receiving a measurement performed by a user device.

In an embodiment, the at least one image is selected from the group consisting of a front-view image of the human and a side-view image of the human.

In an embodiment, the at least one image further comprises an additional image of the human taken at an angle of 45 degrees with respect to the front-view image of the human.

In an embodiment, the performing the body segmentation on the at least one image further comprises receiving user input to increase an accuracy of the body segmentation, and the user input comprises a user selection of one or more portions of the body features that correspond to a given region of the human's body.

In an embodiment, the at least one image comprises at least one image of a fully-clothed user or a partially-clothed user, and the generating body feature measurements further comprises generating the body feature measurements on the at least one image of the fully-clothed user or the partially-clothed user.

In an embodiment, the body size measurements comprise first body size measurements, the method further comprises generating second body size measurements using a second sizing machine-learning module, and an accuracy of the second body size measurements is greater than an accuracy of the first body size measurements.

In another embodiment, the method further comprises determining whether a given body feature measurement of the body features corresponds to a confidence level below a predetermined value; and in response to determining that the given body feature measurement corresponds to a confidence level below the predetermined value, performing 3D model matching using a 3D model matching module on the body features to determine a matching 3D model of the human, wherein one or more high-confidence body feature measurements are used to guide the 3D model matching module, performing body feature measurements based on the matching 3D model, and replacing the given body feature measurement with a projected body feature measurement from the matching 3D model.

In yet another embodiment, the method further comprises determining whether a given body feature measurement of the body features corresponds to a confidence level below a predetermined value; and in response to determining that the given body feature measurement corresponds to a confidence level below the predetermined value, performing skeleton detection using a skeleton detection module on the body features to determine joint positions of the human, wherein one or more high-confidence body feature measurements are used to guide the skeleton detection module, performing body feature measurement based on the determined joint positions, and replacing the given body feature measurement with a projected body feature measurement from the skeleton detection module.

In yet another embodiment, the method further comprises pre-processing the at least one image of the human and the background before performing the body segmentation. In an embodiment, the pre-processing comprises at least a perspective correction on the at least one image. In an embodiment, the perspective correction is selected from the group consisting of perspective correction utilizing a head of the human, perspective correction utilizing a gyroscope of a user device, and a perspective correction utilizing another sensor of a user device.

In yet another embodiment, the identifying one or more body features step further comprises generating a segmentation map of the body features on the human; and cropping the one or more identified body features from the human and the background before the performing body feature annotation step, and the performing body feature annotation step utilizes a plurality of annotation deep-learning networks that have been separately trained on each body feature.

In various embodiments, a computer program product is disclosed. The computer program may be used for generating body size measurements of a human, and may include a computer readable storage medium having program instructions, or program code, embodied therewith, the program instructions executable by a processor to cause the processor to perform steps to receive one or more user parameters; receive at least one image containing the human and a background; identify one or more body features associated with the human; perform body feature annotation on the extracted body features for generating an annotation line on each body feature corresponding to a body feature measurement, the body feature annotation utilizing an annotation deep-learning network that has been trained on annotation training data, wherein the annotation training data comprise one or more images for one or more sample body features and an annotation line for each body feature; generate body feature measurements from the one or more annotated body features utilizing a sizing machine-learning module based on the annotated body features and the one or more user parameters; and generate body size measurements by aggregating the body feature measurements for each body feature.

According to yet another embodiment, the present invention is a computer-implemented method for generating body size measurements of a human, the computer-implemented method executable by a hardware processor, the method comprising steps of receiving one or more user parameters from a user device; receiving at least one image from the user device, the at least one image containing the human and a background; performing body segmentation on the at least one image to extract one or more body features associated with the human from the background, the body segmentation utilizing a segmentation deep-learning network that has been trained on segmentation training data; performing body feature annotation on the extracted body features for annotating an annotation line on each body feature corresponding to a body feature measurement, the body feature annotation utilizing an annotation deep-learning network that has been trained on annotation training data, the annotation training data comprising one or more images for one or more sample body features and an annotation line for each body feature; generating body feature measurements from the one or more annotated body features utilizing a sizing machine-learning module based on the annotated body features and the one or more user parameters; and generating body size measurements by aggregating the body feature measurements for each extracted body feature.

In an embodiment, the segmentation training data comprise one or more images for one or more sample humans and a manually-determined body feature segmentation for each body feature for the one or more sample humans.

In an embodiment, the manually-determined body feature segmentation is extracted underneath clothing, and the segmentation training data comprises manually-determined body segmentation estimating the human's body underneath the clothing by an annotator.

In an embodiment, the annotation line on each body feature comprises one or more line segments corresponding to a given body feature measurement, and the generating the body feature measurements from the one or more annotated body features utilizes the annotation line on each body feature.

In an embodiment, the at least one image comprises at least a front-view image and a side-view image of the human, and wherein the method further comprises the following steps after the performing body feature annotation step: calculating at least one circumference of at least one annotated body feature utilizing line-annotated front-view and side-view images and a height of the human; and generating the body feature measurements from the at least one circumference utilizing the sizing machine-learning module based on the at least one circumference, the height, and the one or more user parameters.

In an embodiment, the sizing machine-learning module comprises a random forest algorithm, and the sizing machine-learning module is trained on ground truth data comprising one or more sample body size measurements for one or more sample humans.

In an embodiment, the one or more user parameters are selected from the group consisting of a height, a weight, a gender, an age, and a demographic information.

In an embodiment, the receiving the one or more user parameters from the user device comprises receiving user input of the one or more user parameters through the user device.

In an embodiment, the receiving the one or more user parameters from the user device comprises receiving a measurement performed by the user device.

In an embodiment, the at least one image is selected from the group consisting of a front-view image of the human and a side-view image of the human.

In an embodiment, the at least one image further comprises an additional image of the human taken at an angle of 45 degrees with respect to the front-view image of the human.

In an embodiment, the performing the body segmentation on the at least one image further comprises receiving user input to increase an accuracy of the body segmentation, and the user input comprises a user selection of one or more portions of the extracted body features that correspond to a given region of the human's body.

In an embodiment, the at least one image comprises at least one image of a fully-clothed user or a partially-clothed user, and the generating body feature measurements further comprises generating the body feature measurements on the at least one image of the fully-clothed user or the partially-clothed user.

In an embodiment, the body size measurements comprise first body size measurements, the method further comprises generating second body size measurements using a second machine-learning module, and an accuracy of the second body size measurements is greater than an accuracy of the first body size measurements.

In another embodiment, the method further comprises determining whether a given body feature measurement of the extracted body features corresponds to a confidence level below a predetermined value; and in response to determining that the given body feature measurement corresponds to a confidence level below the predetermined value, performing 3D model matching using a 3D model matching module on the extracted body features to determine a matching 3D model of the human, wherein one or more high-confidence body feature measurements are used to guide the 3D model matching module, performing body feature measurements based on the matching 3D model, and replacing the given body feature measurement with a projected body feature measurement from the matching 3D model.

In yet another embodiment, the method further comprises determining whether a given body feature measurement of the extracted body features corresponds to a confidence level below a predetermined value; and in response to determining that the given body feature measurement corresponds to a confidence level below the predetermined value, performing skeleton detection using a skeleton detection module on the extracted body features to determine joint positions of the human, wherein one or more high-confidence body feature measurements are used to guide the skeleton detection module, performing body feature measurement based on the determined joint positions, and replacing the given body feature measurement with a projected body feature measurement from the skeleton detection module.

In yet another embodiment, the method further comprises pre-processing the at least one image of the human and the background before performing the body segmentation, the pre-processing comprises at least a perspective correction on the at least one image, and the perspective correction is selected from the group consisting of perspective correction utilizing a head of the human, perspective correction utilizing a gyroscope of the user device, and a perspective correction utilizing another sensor of the user device.

In yet another embodiment, a computer program product may be used for generating body size measurements of a human, and may include a computer readable storage medium having program instructions, or program code, embodied therewith, the program instructions executable by a processor to cause the processor to perform steps to receive one or more user parameters from a user device; receive at least one image from the user device, the at least one image containing the human and a background; perform body segmentation on the at least one image to extract one or more body features associated with the human from the background, the body segmentation utilizing a segmentation deep-learning network that has been trained on segmentation training data; perform body feature annotation on the extracted body features for drawing an annotation line on each body feature corresponding to a body feature measurement, the body feature annotation utilizing an annotation deep-learning network that has been trained on annotation training data, wherein the annotation training data comprise one or more images for one or more sample body features and an annotation line for each body feature; generate body feature measurements from the one or more annotated body features utilizing a sizing machine-learning module based on the annotated body features and the one or more user parameters; and generate body size measurements by aggregating the body feature measurements for each body feature.

In various embodiment, a system is described, including a memory that stores computer-executable components; a hardware processor, operably coupled to the memory, and that executes the computer-executable components stored in the memory, wherein the computer-executable components may include a components communicatively coupled with the processor that execute the aforementioned steps.

In another embodiment, the present invention is a non-transitory, computer-readable storage medium storing executable instructions, which when executed by a processor, causes the processor to perform a process for generating body measurements, the instructions causing the processor to perform the aforementioned steps.

In another embodiment, the present invention is a system for full body measurements extraction using a 2D phone camera, the system comprising a user device having a 2D camera, a processor, a display, a first memory; a server comprising a second memory and a data repository; a telecommunications-link between said user device and said server; and a plurality of computer codes embodied on said first and second memory of said user-device and said server, said plurality of computer codes which when executed causes said server and said user-device to execute a process comprising the aforementioned steps.

In yet another embodiment, the present invention is a computerized server comprising at least one processor, memory, and a plurality of computer codes embodied on said memory, said plurality of computer codes which when executed causes said processor to execute a process comprising the aforementioned steps.

Other aspects and embodiments of the present invention include the methods, processes, and algorithms comprising the steps described herein, and also include the processes and modes of operation of the systems and servers described herein.

Yet other aspects and embodiments of the present invention will become apparent from the detailed description of the invention when read in conjunction with the attached drawings.

BRIEF DESCRIPTION OF THE DRAWINGS

Embodiments of the present invention described herein are exemplary, and not restrictive. Embodiments will now be described, by way of examples, with reference to the accompanying drawings, in which:

FIG. 16 shows an illustrative diagram of the mobile device GUI requesting the user to enter their height (and optionally other user parameters, such as weight, age, sex, etc.) and to select their preferred fit style (tight, regular, or loose fit), according to one embodiment of the present invention.

FIG. 17 shows an illustrative diagram of the mobile device GUI for capturing the front view photo, according to one embodiment of the present invention.

FIG. 18 shows another illustrative diagram of the mobile device GUI for capturing the front view photo, according to one embodiment of the present invention.

FIG. 19 shows an illustrative diagram of the mobile device GUI for capturing the side view photo, according to one embodiment of the present invention.

FIG. 20 shows an illustrative diagram of the mobile device GUI that is displayed while the system processes the captured photos to extract the body measurements, according to one embodiment of the present invention.

FIG. 21 shows an illustrative diagram of the mobile device GUI showing a notification screen when the body measurements have been successfully extracted, according to one embodiment of the present invention.

DETAILED DESCRIPTION OF THE INVENTION

Overview

With reference to the figures provided, embodiments of the present invention are now described in detail.

In the following description, for purposes of explanation, numerous specific details are set forth in order to provide a thorough understanding of the invention. It will be apparent, however, to one skilled in the art that the invention can be practiced without these specific details. In other instances, structures, devices, activities, and methods are shown using schematics, use cases, and/or flow diagrams in order to avoid obscuring the invention. Although the following description contains many specifics for the purposes of illustration, anyone skilled in the art will appreciate that many variations and/or alterations to suggested details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

Others have tried many different types of approaches to generate or extract body measurements from images of users. All of these approaches generally require the user to have specific poses, stand at a specific distance from the camera, in front of an empty background, wear tight fitting shirt, and/or go partially nude wearing only underwear. Such requirements for controlled environments and significant user friction are undesirable.

The present invention solves the aforementioned problems by providing a system and method for accurately extracting body measurements from 2D photos with 1) the human in any pose, 2) the human standing in front of any background type, 3) the photos taken at any distance, and 4) the human wearing any type of clothing, such that everyone can easily take photos of themselves and benefit from full body measurement extraction. Some embodiments of the present invention do not involve any 3D reconstruction or 3D body models, nor do they require specialized hardware cameras. Instead, advanced computer vision combined with deep-learning techniques are used to generate accurate body measurements no matter what the user is wearing from photos provided from a simple mobile device camera. In the present disclosure, the term "2D phone camera" is used to represent any traditional cameras embedded in, or connected to, computing devices, such as smart phones, tablets, laptops, or desktops.

Deep Learning Networks and Machine Learning for Body Measurements

Figure 1A:
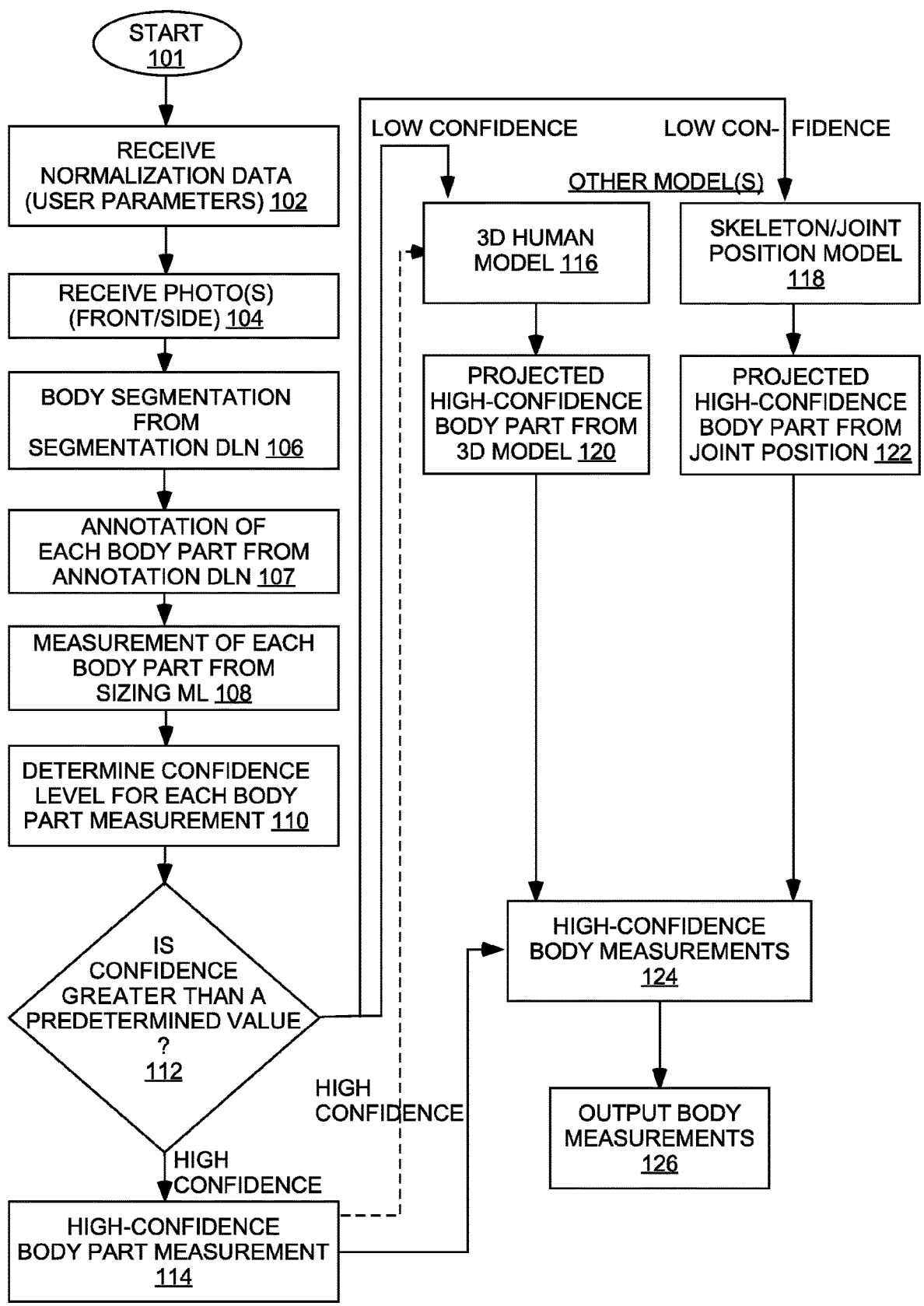
FIG. 1A shows an example flow diagram for body measurement determination utilizing deep learning networks (DLNs) and machine learning, in accordance with one embodiment of the invention.

FIG. 1A shows a diagram of an example flow for body measurement determination operations, in accordance with example embodiments of the disclosure. In some embodiments of the prevent invention, computer vision techniques and deep learning are applied to one front view photo and one side view photo of the user, plus the user's height, and possibly other user parameters such as weight, sex, age, etc. and generate full body measurements using one or more deep learning networks that have been trained on annotated body measurements collected and annotated for thousands of sample humans. As more data is collected by the system, the accuracy of the body measurements automatically improves. In some other embodiments, perspective correction, human background subtraction, skeleton detection, and 3D model matching approaches, utilizing computer vision techniques, are used to improve on any low-confidence body measurements from the deep learning approach. This hybrid approach significantly improves body measurement accuracy, and increases user satisfaction with the body measurements. In case the body measurements are used for custom garment manufacture, the resultant accuracy improves customer service and reduces return rates for the manufactured custom garments.

The overall process begins at step 101. At step 102, normalization data (one or more user parameters), such as a height of the user, is obtained, generated, and/or measured in order to perform a normalization or a scaling. In another embodiment, a weight may also be used in conjunction with the height. Both user parameters may be determined automatically (e.g., using computer vision algorithms or mined from one or more databases), or determined from the user (e.g., user input). In one embodiment, from these user parameters, a body mass index (BMI) may be calculated. The BMI may be used to calibrate the body measurement extraction using both the body weight and height. Additional user parameters may include at least one of a height, a weight, a gender, an age, race, country of origin, athleticism, and/or other demographic information associated with the user, among others. The height of the user is used to normalize, or scale, front and/or side-view photos and provide a known size reference for the human in the photo. The other user parameters, such as the weight, BMI index, age, sex, and so forth, are used as additional inputs into the system to optimize the body sizing measurements. In one embodiment, the other user parameters may also be obtained automatically from the user device, from one or more third-party data sources, or from the server.

At step 104, one or more user photos may be received; for example, at least one front and/or side view photos of a given user may be received. In another embodiment, the photos may be obtained from the user device (e.g., mobile phone, laptop, tablet, etc.). In another embodiment, the photos may be obtained from a database (e.g., a social media database). In another embodiment, the user photos include a photo showing a front view and a photo showing a side view of the entire body of the user. In some embodiments, only one photo, such as a front view, is utilized and the one photo is sufficient to perform accurate body measurement extraction. In yet other embodiments, three or more photos are utilized, including in some embodiments a front view photo, a side view photo, and a photo taken at a 45 degree angle. Other combinations of user photos are within the scope of the present invention, as would be recognized by one of ordinary skill in the art. In some embodiments, a user video, for example a front view, a 90, 180, or even 360 degree view of the user may be received. From the user video, one or more still frames or photos, such as a front view, a side view, and/or a 45-degree view of the user are extracted from the video, and used in the process that follows. Steps 102 and 104 may be performed in any order in various embodiments of the present invention, or the two steps may be implemented in parallel.

In one embodiment, the system may automatically calculate (e.g., using one or more AI-algorithms) body measurements using the photos and the normalization data, as further described below in connection with the following steps. In another embodiment, the user may indicate whether the user is dressed in tight, normal, or loose clothing for more accurate results.

In one embodiment, the images may be taken at a specified distance (e.g., approximately 10 feet away from the camera of a user's device). In one embodiment, the images may be taken with the user having a specific pose (e.g., arms in a predetermined position, legs spread at a shoulder length, back straight, "A-pose," etc.). In another embodiment, multiple images of a given position (e.g., front and side view photos) may be taken and an average image may be determined for each position. This may be performed to increase accuracy. In another embodiment, the user may be positioned against a background of a specific type (e.g., a neutral color, or having a predetermined background image). In some embodiments, the user may be positions against any type of background. In one embodiment, the front and side view photos may be taken under similar lighting conditions (e.g., a given brightness, shadow, and the like). In another embodiment, the front and side view photos may include images of the user wearing normally fitted clothing (e.g., not extra loose or extra tight). Alternatively, or additionally, the front and side view photos may include images of the user partially clothed (e.g., shirtless), or having a different type of fit (e.g., tight, loose, etc.) depending on the needs of the AI-based algorithms and associated processes.

In some embodiments, a pre-processing on the one or more photos of the user (not shown in FIG. 1A), such as a perspective correction, may be performed on the front and side view photos, if needed. For example, the system may use OpenCV, an open-source machine vision library, and may make use of features of the head in the front and side view photos and the user's height as references for perspective correction. In this way, embodiments of the disclosure may avoid determining measurements which are inaccurate as far as the proportions of the lengths of the body go, such as torso length and leg length. Optionally, a perspective side photo showing where the camera is positioned relative to the person being photographed may yield even more accurate perspective correction by allowing the system to calculate the distance between the camera and the user. In some embodiments, the system may instead use gyroscope data provided by the user device (or a peripheral device connected to the user device, such as an attached computer device) to detect a photo perspective angle, and perform perspective correction based on this photo perspective angle.

In some embodiments, one or more additional pre-processing steps (not shown in FIG. 1A) may be performed on the one or more photos of the user. Various computer vision techniques may be utilized to further pre-process the one or more images. Examples of pre-processing steps may include, in addition to perspective correction, contrast, lighting, and other image processing techniques to improve the quality of the one or more images before further processing.

At step 106, a body feature, such as a body part of the human (e.g., a neck, an arm, a leg, etc.) may be identified or extracted from the image using a first deep learning network (DLN) known as a segmentation DLN. In one embodiment, "deep learning" may refer to a class of machine learning algorithms that use a cascade of multiple layers of nonlinear processing units for feature extraction and transformation modeled after neural networks. In one embodiment, the successive layers may use the output from the previous layer as input. In one embodiment, the "deep" in "deep learning" may refer to the number of layers through which the data is transformed. An example of body feature extraction is explained and shown in reference to FIGS. 3-4 below.

Figure 2:
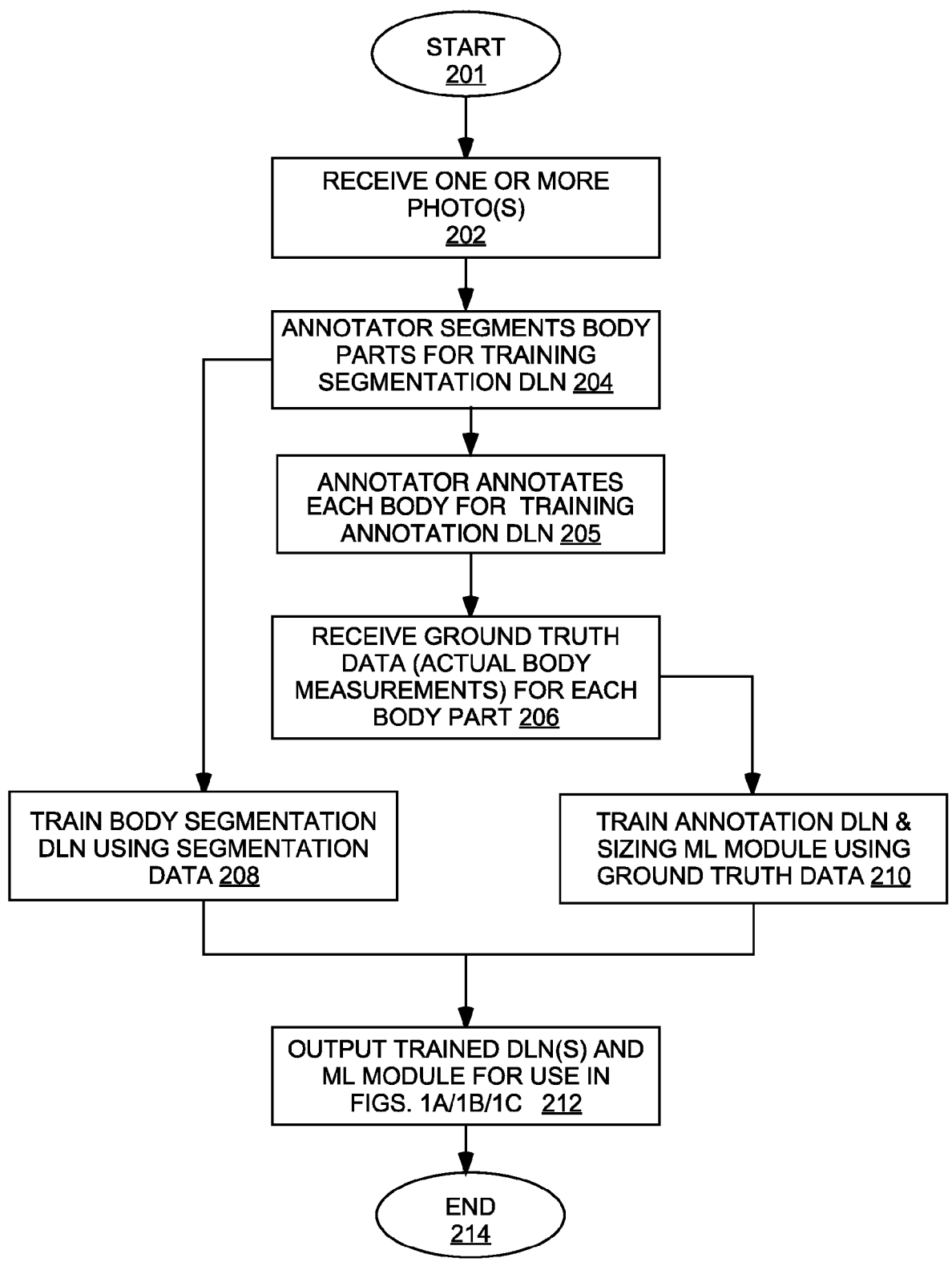
FIG. 2 shows an example flow diagram for training the deep learning networks (DLNs) and the machine learning module, which are used with the flow diagram of FIG. 1A for body measurement determination, in accordance with example embodiments of the disclosure.

Before performing this segmentation step on data from a real user, the system may have been trained first, for example, on sample photos of humans posing in different environments in different clothing, for example, with hands at 45 degrees, sometimes known as the "A-pose", as described in relation to FIG. 2. In some embodiments, any suitable deep learning architecture may be used, such as deep neural networks, deep belief networks, and/or recurrent neural networks. In another embodiment, the deep learning algorithms may learn in supervised (e.g., classification) and/or unsupervised (e.g., pattern analysis) manners. Further, the deep learning algorithms may learn multiple levels of representations that correspond to different levels of abstraction of the information encoded in the images (e.g., body, body part, etc.). In another embodiment, the images (e.g., the front and side photos) may be represented as a matrix of pixels. For example, in one embodiment, the first representational layer may abstract the pixels and encode edges; the second layer may compose and encode arrangements of edges; the third layer may encode a nose and eyes; and the fourth layer may recognize that the image contains a face, and so on.

In one embodiment, the segmentation DLN algorithm may be trained with segmentation training data, as described in relation to FIG. 2 below. In some embodiments, the segmentation training data may include thousands of sample humans with manually-segmented body features. In some embodiments, the training data includes medical data, for example from CAT scans, MRI scans, and so forth. In some embodiments, the training data includes data from previous tailor or 3D body measurements that include 3D body scans from 3D body scanners and "ground truth" data. In some embodiments, the 3D body scans may be used to extract approximate front and/or side view photos, in cases where the front and side view photos are not explicitly available. In some embodiments, the ground truth data comprises human tailor-measured data; while in other embodiments, the ground truth data comprises automatically extracted 1D body size measurements from the 3D body scans. In some embodiments, 3D body scan data from the "SizeUSA" data set, which is a commercial sample of 3D body scans obtained on about 10,000 human subjects (both male and female), may be utilized. In other embodiments, 3D body scan data from the "CAESAR" data set may be utilized, which is another commercial sample of 3D body scans obtained on about 4,000 human subjects, and also includes manually-measured ground truth data using a human tailor. In yet other embodiments, an organization utilizing the present invention may capture their own front and side photos, along with suitable ground truth data using a human tailor, for training the segmentation DLN. In yet other embodiments, segmentation training data may be automatically generated by one or more algorithms, including one or more deep learning networks, instead of being manually segmented by a human operator.

In one embodiment (not shown in FIG. 1A), the identified body parts are segmented, separated, or cropped from the rest of the human and the background using the segmentation map generated in step 106. The cropping may be actual or virtual cropping. The part of the image corresponding to each identified body part may be cropped, segmented, or separated from the rest of the image, and that part of the image passed to the annotation step 107. By cropping or separating the identified body parts from the rest of the image, the annotation DLN used in annotation step 107 can be specially or separately trained on each separate body part, increasing both accuracy and reliability.

At step 107, an annotation line for each body part that was identified or extracted at step 106 may be determined using one or more additional deep learning networks (DLNs), for example an annotation DLN. In one embodiment, there is one body feature annotation DLN for the entire body. In another embodiment, there is a separate body feature annotation DLN for each body part. An advantage of using a separate body feature annotation DLN for each body part is increased accuracy and reliability in body part measurements. Each body part DLN may be separately trained on separate and unique data for each body part. The specificity of data on each body part increases the accuracy and reliability of the DLN, and also increases the speed of convergence of the neural network layer training. An example of body feature annotation is explained and shown in reference to FIGS. 5-6 below.

In one embodiment, the system may generate and extract body feature measurements by using an AI-based algorithm such as an annotation DLN, for example, by first generating annotation lines from signals obtained from the body features. Each annotation line may be different for each body feature and may be drawn differently. For example, for the bicep width or circumference, the system may draw a line perpendicular to the skeletal line at the bicep location; for the chest, the system may connect two chest dots instead. From the annotation of each body feature, a body feature measurement may then be obtained by normalizing on the user's height received in step 102, as described further below.

Before performing this annotation step on data from a real user, the system may have been trained first, for example, on sample photos of humans posing in different environments in different clothing, for example, with hands at 45 degrees, sometimes known as the "A-pose", as described in relation to FIG. 2 further below. In yet other embodiments, annotation training data may be automatically generated by one or more algorithms, including one or more deep learning networks, instead of being manually annotated by a human operator. The segmentation and annotation DLNs are described in more detail in relation to FIGS. 1B, 1C, and 1D.

At step 108, a body feature measurement may be estimated for each body part that had an annotation line generated at step 107 using one or more machine learning algorithms, for example a sizing machine learning (ML) algorithm. In one embodiment, the sizing ML algorithm comprises a random forest machine learning module. In one embodiment, there is a separate sizing ML module for each body part. In some embodiments, there is one sizing ML module for the entire body. In one embodiment, the system may determine the sizes of the body features using as input the height received in step 102 to normalize the sizing estimates. In order to do this, the annotation DLN in one embodiment draws a "full body" annotation line indicating a location of the subject's height, with a dot representing a bottom of the subject's feet and another dot representing a top of the subject's head. This "fully body" annotation line is used to normalize other annotation lines by the subject's known height provided in step 102. In other words, the height of the subject in the image is detected, and used along with the known actual height to normalize all annotation line measurements. This process may be thought of as "height reference normalization," using the subject's known height as a standard measurement for normalization. In another embodiment, an object of known size, such as a letter or A4 size paper, or a credit card, may be used as a normalization reference, instead of or in addition to, the user's height.

Figure 1B:
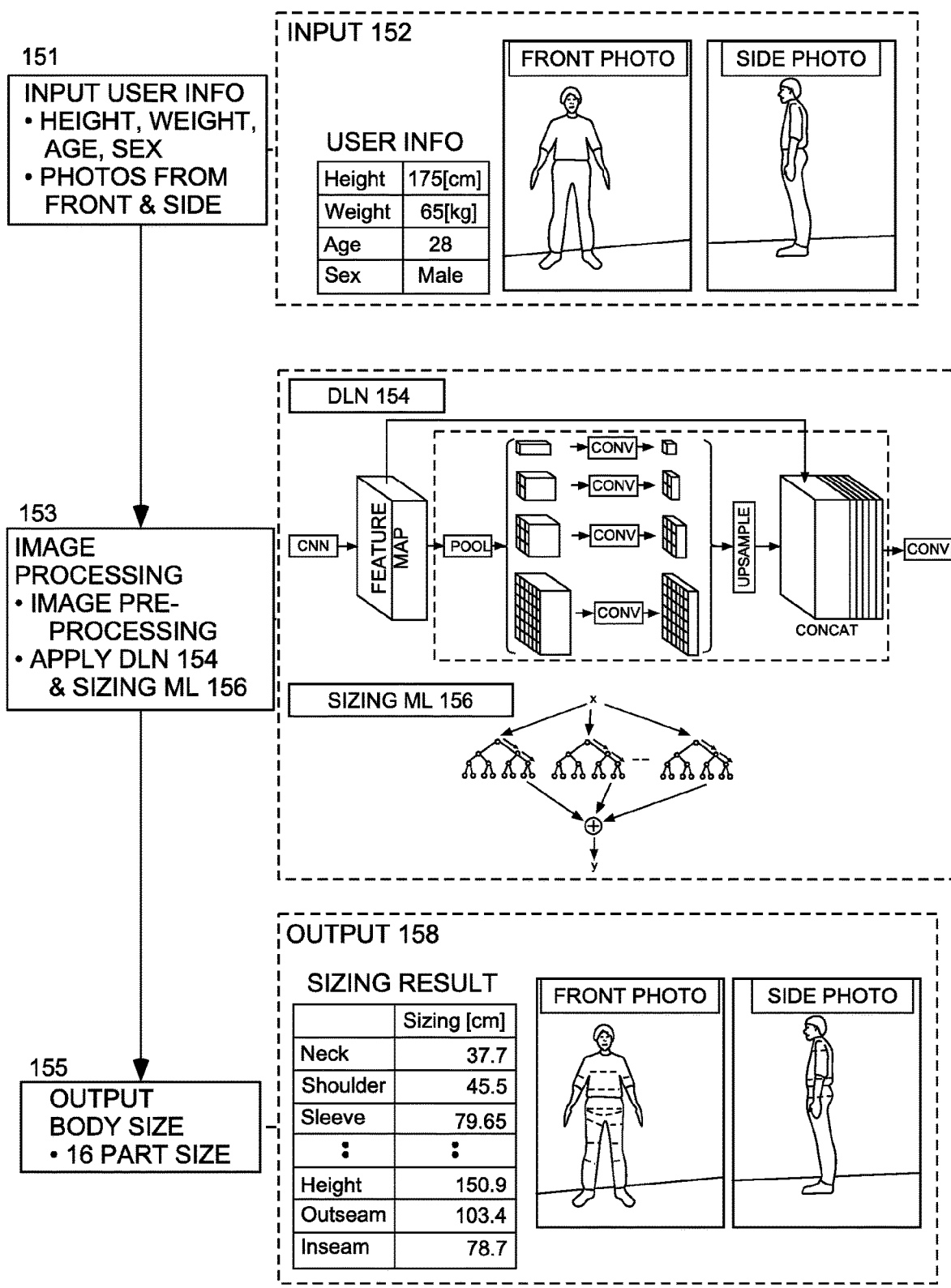
FIG. 1B shows another example flow diagram for body measurement determination using deep learning networks (DLNs) and machine learning, in accordance with another embodiment of the invention.
Figure 1C:
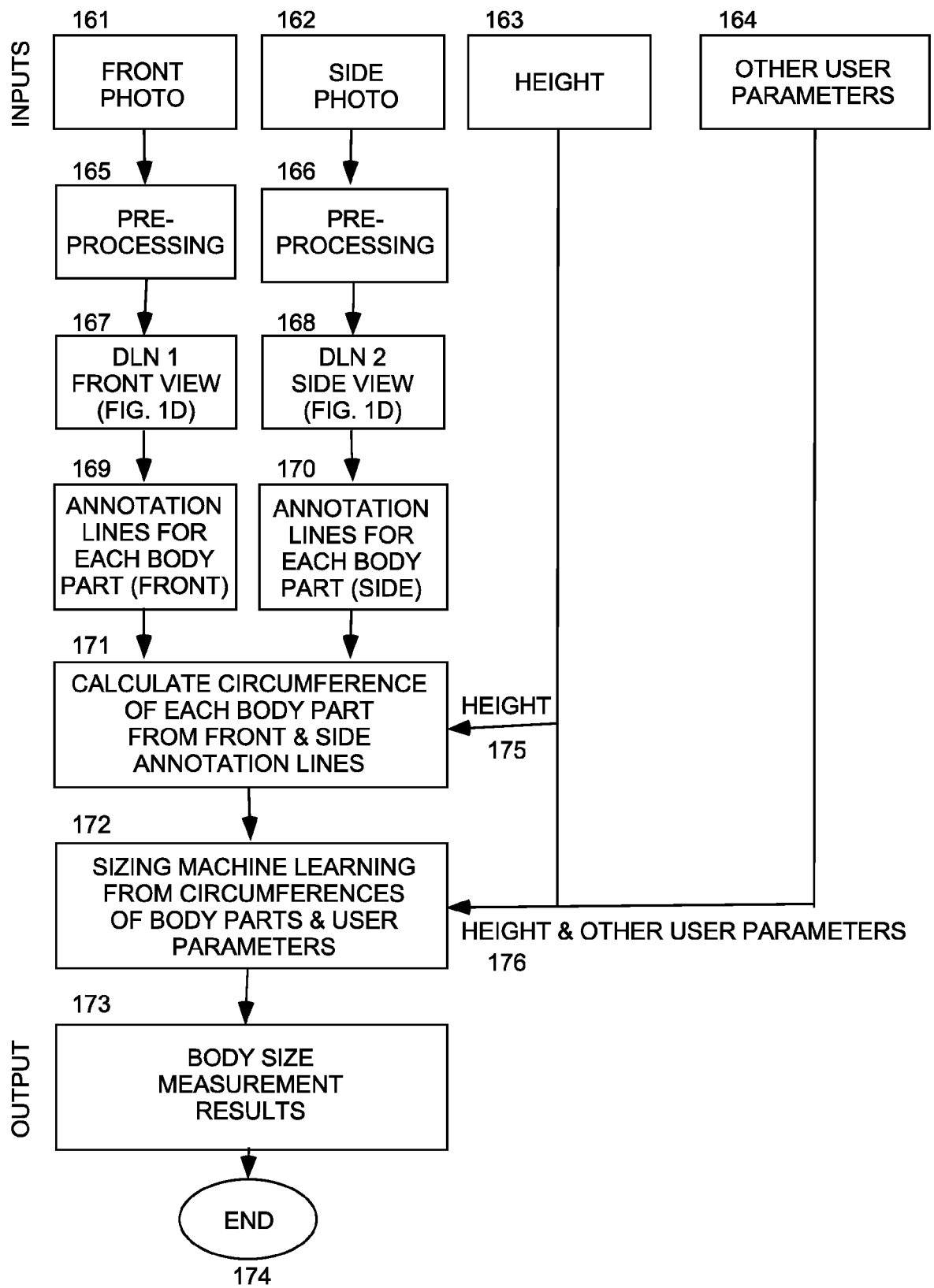
FIG. 1C shows a detailed flow diagram for body measurement determination using deep learning networks (DLNs) and machine learning, in accordance with another embodiment of the invention.
Figure 1D:
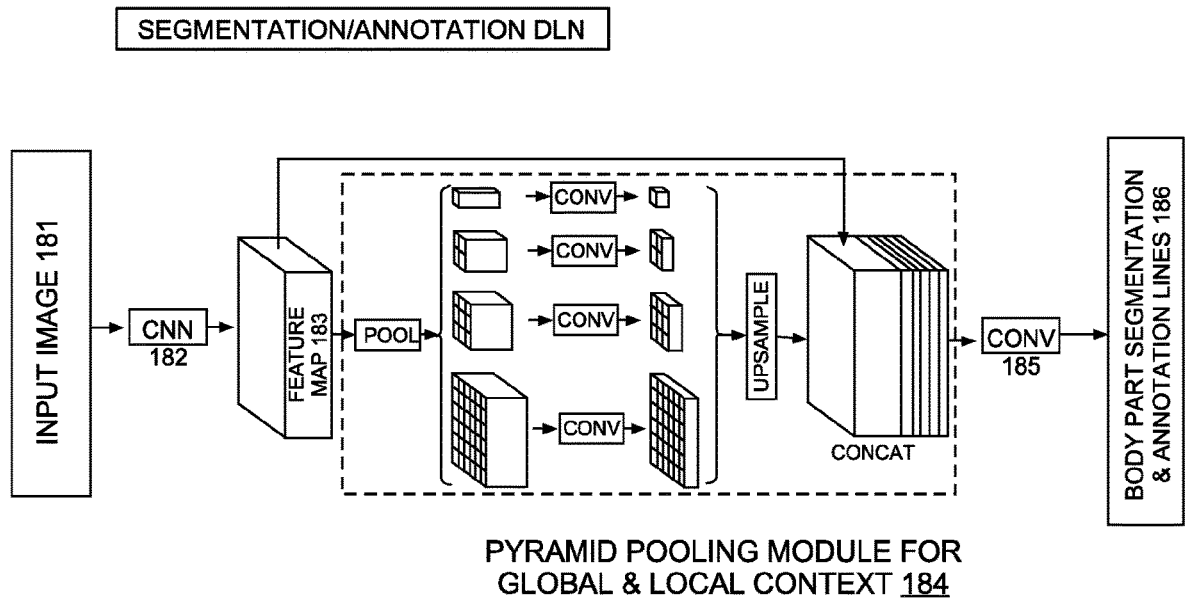
FIG. 1D shows a detailed flow diagram for body part segmentation and annotation using deep learning networks (DLNs), in accordance with one embodiment of the invention.
Figure 1E:
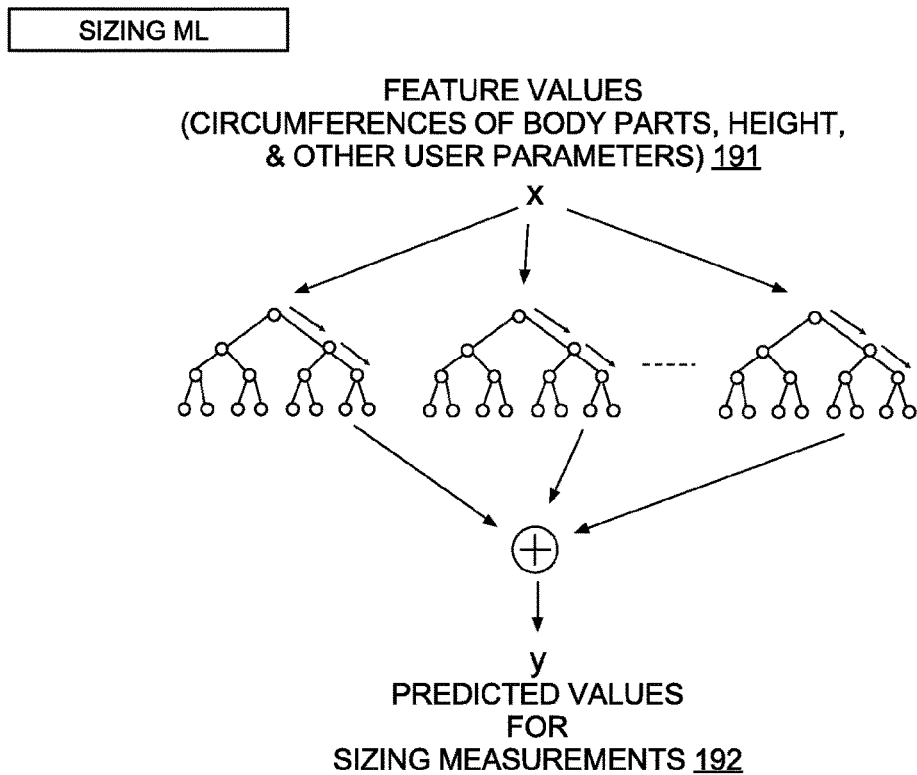
FIG. 1E shows an illustrative diagram for a machine learning algorithm for body sizing determination from one or more feature values obtained from the deep learning networks (DLNs), in accordance with another embodiment of the invention.

In another embodiment, additional user demographic data, such as, but not limited to, weight, a BMI index, a gender, an age, and/or other demographic information associated with the user received in step 102 is used as input to the sizing ML algorithm (such as random forest), described in greater detail in relation to FIG. 1E.

The system may also use other algorithms, means, and medians for each body feature measurement. The annotation DLN and sizing ML may be implemented as one sizing DLN, that annotates and performs measurements on each body feature, or may be implemented as two separate modules, an annotation DLN that annotates each body feature, and a separate sizing ML module that performs the measurements on the annotated body feature. Similarly, various alternative architectures for implementing the segmentation DLN of step 106, the annotation DLN of step 107, and the sizing ML module of step 108 are described in relation to FIGS. 8-10 below. For example, FIG. 8 corresponds to the architecture shown in FIG. 1A, in which the segmentation DLN, annotation DLN, and sizing ML module are separate modules. In contrast, FIG. 9 corresponds to an alternative architecture (not shown in FIG. 1A) in which the segmentation DLN and annotation DLN are combined into a single annotation DLN (that effectively performs both segmentation and annotation) followed by a sizing ML module. Finally, FIG. 10 corresponds to yet another alternative architecture (not shown in FIG. 1A) in which the segmentation DLN, annotation DLN, and sizing ML module are all combined into a single sizing DLN that effectively performs all functions of segmentation, annotation, and size measurement.

Optionally, at step 110, a confidence level for each body feature measurement may be determined, obtained, or received from the sizing ML module from step 108. In addition to outputting the predicted body measurements for each body feature, the sizing ML module also outputs a confidence level for each predicted body feature measurement, which is then utilized to determine if any other approaches should be utilized to improve on the output, as described below. In another embodiment, the confidence level may be based on a confidence interval. In particular, a confidence interval may refer to a type of interval estimate, computed from the statistics of the observed data (e.g., the front and side photos encoding image data), that might contain the true value of an unknown population parameter (e.g., a measurement of a body part). The interval may have an associated confidence level that may quantify the level of confidence that the parameter lies in the interval. More strictly speaking, the confidence level represents the frequency (i.e. the proportion) of possible confidence intervals that contain the true value of the unknown population parameter. In other words, if confidence intervals are constructed using a given confidence level from an infinite number of independent sample statistics, the proportion of those intervals that contain the true value of the parameter will be equal to the confidence level. In another embodiment, the confidence level may be designated prior to examining the data (e.g., the images and extracted measurements therefrom). In one embodiment, a 95% confidence level is used. However, other confidence levels can be used, for example, 90%, 99%, 99.5%, and so on.

In various embodiments, a confidence interval and corresponding confidence level may be determined based on a determination of a validity and/or an optimality. In another embodiment, validity may refer to the confidence level of the confidence interval holding, either exactly or to a good approximation. In one embodiment, the optimality may refer to a rule for constructing the confidence interval should make as much use of the information in the data-set (images and extracted features and measurements) as possible.

At step 112, it may be determined whether the confidence level is greater than a predetermined value. If it is determined that the confidence level is greater than the predetermined value, then the process may proceed to step 114, where the high-confidence body feature measurements may be outputted. If it is determined that the confidence level is less than the predetermined value, then the process may proceed to step 116 or step 118. The steps 116 and 118 are illustrative of one or more, optional, fallback algorithms for predicting or projecting estimated body feature measurements for those body features for which the deep-learning approach has a low confidence. Together with the high-confidence body feature measurements from the deep-learning approach (shown in dashed lines), and the projected body feature measurements from the alternative fallback algorithms for the low-confidence body feature measurements, are later synthesized into a complete set of high-confidence body feature measurements as described below. As noted, in another embodiment, the confidence level may be designated prior to examining the data (e.g., the images and extracted measurements therefrom).

In particular, at steps 116 and 118, other optional models (e.g., AI-based or computer vision-based models) may be applied. At step 116, and according to one optional embodiment, a 3D human model matching algorithm may be applied. For example, the system may first utilize OpenCV and/or deep learning techniques to extract the human body from the background. The extracted human body is then matched to one or more known 3D human models in order to obtain body feature measurements. Using this technique and a database of existing 3D body scans, for example a database of several thousand 3D body scans, the system may match the closest body detected with the 3D body scans' points. Using the closest matching 3D model, the system may then extract body feature measurements from the 3D model. This technique is described in more detail in relation to FIG. 11 below.

Alternatively, and/or additionally, at step 118, other models, such as a skeleton/joint position model may be applied. In one embodiment, skeleton/joint detection may be performed using OpenPose (discussed further below), an open source algorithm for pose detection. Using this technique to obtain the skeleton and joint positions, the system may then draw lines between the appropriate points, using an additional deep learning network (DLN) if necessary, that indicates positions of the middle of the bone that are drawn on top of the user photos to indicate various key skeletal structures, showing where various body parts, such as the shoulders, neck, and arms are. From this information, body feature measurements may be obtained from the appropriate lines. For example, a line connecting the shoulder and the wrist may be used to determine the arm length. This technique is described in detail in relation to FIG. 11 below.

In one embodiment, the 3D model algorithm and the skeleton/joint position models are combined as follows (though this is not shown explicitly in FIG. 1A). Using a database of existing 3D body scans, for example a database of several thousand 3D body scans, the system may match the closest skeleton detection with the 3D body scans' skeleton points, showing points and lines that indicate positions of the bone that indicate various key skeletal structures, showing where various body parts, such as the shoulders, neck, and arms are. Once the closest matching 3D model is matched, the system may extract body feature measurements from the 3D model.

In either or both cases, at step 120, or at step 122, or both, the high-confidence body feature measurements may be projected (e.g., estimated). In particular, the estimate of the high-confidence body feature measurement may be performed using a different process from the first, lower-confidence deep-learning process (e.g., that shown and described in connection with step 108, above).

One advantageous feature of this approach is that the high-confidence body feature measurements from step 114 (shown as a dashed line) may be used as inputs to assist with calibrating the other models, for example the 3D human model algorithm in step 116 and the skeleton/joint position model in step 118. That is, the high-confidence body feature measurements from the deep learning approach obtained in step 108, may be used to assist the other models, for example 3D human model 116 and/or skeleton/joint position model 118. The other models (116 and/or 118) may then be used to obtain projected high-confidence body feature measurements for those body feature measurements that were determined to be have a confidence below a predetermined value in step 112. Later, the projected high-confidence body feature measurements may replace or supplement the low-confidence body feature measurements from the deep-learning approach.

Further, at step 124, the high confidence body feature measurements determined at step 120 and/or step 122 may be used to determine a high-confidence body feature measurement. In such a way, various models, that is, the 3D human model and the skeleton/joint position model, may both be used to further improve the accuracy of the body feature measurements obtained in step 114. Therefore, the high-confidence body feature measurements are aggregated—the high-confidence body feature measurements from step 114 (e.g., the deep-learning approach) are combined with the projected high-confidence body feature measurements from steps 120 and 122 (e.g., the other models).

At step 126, the high-confidence body feature measurements are aggregated into complete body measurements of the entire human body, and are then output for use. In particular, the body measurements may be output to a user device and/or a corresponding server, for example associated with a company that manufactures clothing based on the measurements. In one embodiment, the output may be in the form of a text message, an email, a textual description on a mobile application or website, combinations thereof, and the like. The complete body measurements may then be used for any purposes, including but not limited to custom garment generation. One of ordinary skill in the art would recognize that the output of the complete body measurements may be utilized for any purpose in which accurate and simple body measurements are useful, such as but not limited to fitness, health, shopping, and so forth.

FIG. 1B shows another example flow diagram for body measurement determination using deep learning networks (DLNs) and machine learning, in accordance with another embodiment of the invention. In step 151, input data 152, which comprises a front photo, side photo, and user parameters (height, weight, age, sex, etc.) are received. In step 153, one or more image processing steps are applied. First, optional image pre-processing (perspective correction, human cropping, resizing etc.) steps may be performed. Next, the deep-learning network (DLN) 154 is applied to the images for segmenting and annotating the body features, as described in greater detail in relation to FIG. 1D. Next, the sizing machine learning module (ML) 156 is applied to the annotated body features for determining the body size measurements from the annotation lines and one or more of the user parameters, as described in greater detail in relation to FIG. 1E. Finally, in step 155, the body size measurements (for example, 16 standard body part sizes) are output, shown illustratively as output data 158. The output 158 may include the sizing result (a set of standard body size measurements, such as neck, shoulder, sleeve, height, outseam, inseam, etc.), and may also include the front and side photos annotated with the annotation lines.

FIG. 1C shows a detailed illustrative flow diagram for body measurement determination using deep learning networks (DLNs) and machine learning, in accordance with another embodiment of the invention. Inputs to the body measurement process include front photo 161, side photo 162, height 163, and other user parameters (weight, age, sex, etc.) 164. The front photo 161 is pre-processed in step 165, while the side photo 162 is pre-processed in step 166. Examples of pre-processing steps, such as perspective correction, human cropping, image resizing, etc. were previously discussed. At step 167, the pre-processed front photo is used as input to DLN 1 (segmentation-annotation DLN, described in more detail in relation to FIG. 1D) to generate annotation lines for the front photo 161. At step 168, the pre-processed side photo is used as input to DLN 2 (segmentation-annotation DLN) to analogously generate annotation lines for the side photo 161. The annotation lines for each body part from the front view 169 are output from DLN 1 and the annotation lines for each body part from the side view 170 are output from DLN 2. At step 171, the two sets of annotation lines from the front photo 161 and the side photo 162 are utilized, along with the height normalization reference 175 received from height input 163, to calculate a circumference of each body part. At step 172, the circumference of each body part, along with the height and other user parameters 176 received from inputs 163 and 164, are utilized in a machine learning algorithm, such as random forest (described in more detail in relation to FIG. 1E), to calculate one or more body size measurements. At step 173, the body size measurement results (length of each standard measurement) are output. Finally, the body measurement process ends at step 174.

Illustrative Deep Learning Network and Machine Learning Architectures

FIG. 1D shows a detailed flow diagram for body part segmentation and annotation, in accordance with one embodiment of the invention. In one embodiment, the body part segmentation and annotation is done using a deep learning network (DLN) using training data as described above. In one embodiment, the body part segmentation and annotation is performed using a convolutional neural network (CNN) combined with a pyramid scene parsing network (PSPNet) for improved global and local context information. In a PSPNet, the process may utilize global & local context information from different sized regions that are aggregated through a pyramid pooling module 184. As shown in FIG. 1D, the input image 181 is first passed through a convolutional neural network (CNN) 182 to obtain a feature map 183 which classifies or segments each pixel into a given body part and/or annotation line. Next, global & local context information is extracted from the feature map 183 utilizing the pyramid pooling module 184, which aggregates information from the image on different size scales. Finally, the data is passed through a final convolution layer 185 to classify each pixel into body part segments and/or annotation lines 186.

In greater detail, from an input image 181, a CNN 182 is first used to obtain a feature map 183, then a pyramid pooling module 184 is used to extract different sub-regions' features; followed by up-sampling and concatenation layers to form the final feature representation, which carries both local and global context information. Finally, the feature representation is fed to a final convolution layer 185 to obtain the final per-pixel prediction. In the example shown in FIG. 1D, the pyramid pooling module 184 combines features under four different scales. The largest scale is global; the subsequent levels separate the feature map into different sub-regions. The output of different levels in the pyramid pooling module 184 comprise the feature map under different scales. In one embodiment, to maintain the weight of the global features, a convolution layer may be used after each pyramid level to reduce the dimension of context representation, as shown in FIG. 1D. Next, the low-dimension feature maps are up-sampled to get the same size features as the original feature map. Finally, the different feature levels are concatenated with the original feature map 183 for the pyramid pooling module 184 output. In one embodiment, by using a four-level pyramid, as shown, the pooling windows cover the whole, half, and smaller portions of the original image 181.

In one embodiment, the PSPNet algorithm is implementation as described in Hengshuang Zhao, et al., "Pyramid Scene Parsing Network," CVPR 2017, Dec. 4, 2016, available at arXiv:1612.01105. PSPNet is only one illustrative deep learning network algorithm that is within the scope of the present invention, and the present invention is not limited to the use of PSPNet. Other deep learning algorithms are also within the scope of the present invention. For example, in one embodiment of the present invention, a convolutional neural network (CNN) is utilized to extract the body segments (segmentation), and a separate CNN is used to annotate each body segment (annotation).

FIG. 1E shows an illustrative diagram for a machine learning algorithm for body measurement determination from one or more feature values 191 obtained from the deep learning networks (DLNs), in accordance with another embodiment of the invention. In one embodiment, the body part sizing is determined using a random forest algorithm, one illustrative machine learning algorithm. Random forest algorithms use a multitude of decision tree predictors, such that each decision tree depends on the values of a random subset of the training data, which minimizes the chances of overfitting to the training data set. In one embodiment, the random forest algorithm is implementation as described in Leo Breiman, "Random Forests," Machine Learning, 45, 5-32, 2001, Kluwer Academic Publishers, Netherlands, available at doi.org/10.1023/A:1010933404324. Random forest is only one illustrative machine learning algorithm that is within the scope of the present invention, and the present invention is not limited to the use of random forest. Other machine learning algorithms, including but not limited to, nearest neighbor, decision trees, support vector machines (SVM), Adaboost, Bayesian networks, various neural networks including deep learning networks, evolutionary algorithms, and so forth, are within the scope of the present invention. The input to the machine learning algorithm are the features values (x) 191, which comprise the circumferences of the body parts obtained from the deep-learning networks, the height, and the other user parameters, as described in relation to FIG. 1C. The output of the machine learning algorithm are the predicted values for the sizing measurements (y) 192.

As noted, embodiments of devices and systems (and their various components) described herein can employ artificial intelligence (AI) to facilitate automating one or more features described herein (e.g., providing body extraction, body segmentation, measurement extraction, and the like). The components can employ various AI-based schemes for carrying out various embodiments/examples disclosed herein. To provide for or aid in the numerous determinations (e.g., determine, ascertain, infer, calculate, predict, prognose, estimate, derive, forecast, detect, compute) described herein, components described herein can examine the entirety or a subset of the data to which it is granted access and can provide for reasoning about or determine states of the system, environment, etc. from a set of observations as captured via events and/or data. Determinations can be employed to identify a specific context or action, or can generate a probability distribution over states, for example. The determinations can be probabilistic—that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, etc.)) schemes and/or systems (e.g., support vector machines, neural networks, expert systems, Bayesian belief networks, fuzzy logic, data fusion engines, etc.) in connection with performing automatic and/or determined action in connection with the claimed subject matter. Thus, classification schemes and/or systems can be used to automatically learn and perform a number of functions, actions, and/or determinations.

A classifier may map an input attribute vector, z=(z1, z2, z3, z4, zn), to a confidence that the input belongs to a class, as by f(z)=confidence(class). Such classification may employ a probabilistic and/or statistical-based analysis (e.g., factoring into the analysis utilities and costs) to determinate an action to be automatically performed. Another example of a classifier that can be employed is a support vector machine (SVM). The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naive Bayes, Bayesian networks, decision trees, neural networks, fuzzy logic models, and/or probabilistic classification models providing different patterns of independence can be employed. Classification as used herein also is inclusive of statistical regression that is utilized to develop models of priority.

Training the Deep Learning Networks and Machine Learning Modules FIG. 2 shows a diagram of an exemplary flow diagram for training the segmentation DLN, the annotation DLN, and the sizing ML, which are utilized in generating body measurements, in accordance with example embodiments of the present invention. The training process begins at step 201. At step 202, one or more photos are received. For example, front and side view photos of a given user may be received. In another embodiment, the photos may be obtained from the user device (e.g., mobile phone, laptop, tablet, etc.). In another embodiment, the photos may be obtained from a database (e.g., a social media database). In another embodiment, the photos from the user include a photo showing a front view and a photo showing a side view of the entire body of the user.

At step 204, an annotator may segment body features, such as body parts, under the clothing using human intuition. In particular, body segmentation may be performed by a human to extract a human body, excluding clothing, from a background of the photos. For example, the human annotator may visually edit (e.g., trace out and color code) photos and indicate which body parts correspond to which portions of the photos to extract the human body, excluding clothing, from the background. In one embodiment, the photos may include humans posing in different environments in different clothing, with hands at 45 degrees ("A-pose"). As noted, accurate body outlines may be drawn by human annotators manually from the background. The ability of human annotators to determine the body shape of photographed humans under any kind of clothing, especially by skilled annotators who are experienced and who can provide accurate and reliable body shape annotations, ensures high performance for the system. The body outlines may be drawn on any suitable software platform, and may use a peripheral device (e.g., a smart pen) for ease of annotation. In another embodiment, printouts of the images may be used and manually segmented with pens/pencils, and the segmented printouts may be scanned and recognized by the system using one or more AI-algorithms (e.g., computer-vision based algorithms). Further, at least a portion of such segmented images may be used as training data that may be fed to the deep learning network at step 208, so a GPU can learn from outlines of humans in the A-pose wearing any clothes in any background. In another embodiment, the segmented body features may be determined automatically, for example, from another training data set, generated from a known 3D model, or otherwise generated using another algorithm, including another deep learning network. The manner of training the segmentation DLN is not a limitation of the present invention. In one embodiment, the segmented images from step 204 are utilized to train the segmentation DLN used in step 106 of FIG. 1A.

At step 205, the annotator may then draw estimated annotation (measurement) lines for each body feature under the clothing using human intuition. As noted, accurate annotation lines may be drawn by human annotators manually from the background. The ability of human workers to determine the correct annotation lines of photographed humans under any kind of clothing, especially by skilled annotators who are experienced and who can provide accurate and reliable body shape annotations, ensures high performance for the system. The annotation lines may be drawn on any suitable software platform, and may use a peripheral device (e.g., a smart pen) for ease of annotation. In another embodiment, printouts of the images may be used and manually annotated with pens/pencils, and the annotated printouts may be scanned and recognized by the system using one or more AI-algorithms (e.g., computer-vision based algorithms). Further, at least a portion of such annotated images may be used as training data that may be fed to the deep learning network at step 210 below, so a GPU can learn from annotation lines of humans in the A-pose wearing any clothes in any background. In another embodiment, the annotation of the body features may be determined automatically, for example, from another training data set, generated from a known 3D model, or otherwise generated using another algorithm, including another deep learning network. The manner of training the annotation DLN is not a limitation of the present invention.

A starting point for any machine learning method such as used by the deep learning component above is a documented dataset containing multiple instances of system inputs and correct outcomes (e.g., the training data). This data set can be used, using methods known in the art, including but not limited to standardized machine learning methods such as parametric classification methods, non-parametric methods, decision tree learning, neural networks, methods combining both inductive and analytic learning, and modeling approaches such as regression models, to train the machine learning system and to evaluate and optimize the performance of the trained system. The quality of the output of the machine learning system output depends on (a) the pattern parameterization, (b) the learning machine design, and (c) the quality of the training database. These components can be refined and optimized using various methods. For example, the database can be refined by adding datasets for new documented subjects. The quality of the database can be improved, for example, by populating the database with cases in which the customization was accomplished by one or more experts in garment customization. Thus, the database will better represent the expert's knowledge. In one embodiment, the database includes data, for example, of poor fitting designs, which can assist in the evaluation of a trained system.

At step 206, actual human measurements for each body feature (e.g., determined by a tailor, or 1D measurements taken from 3D body scans) may be received to serve as ground-truth data. The actual human measurements may be used as validation data and used for training the algorithms used by the system. For example, the actual human measurements may be used in minimizing an error function or loss function (mean squared error, likelihood loss, log-loss, hinge loss, etc.) associated with the machine learning algorithms. In one embodiment, the annotation lines from step 205 and the ground-truth data from step 206 are utilized to train the annotation DLN used in step 107 and the sizing ML step 108 of FIG. 1A.

In one embodiment, the human measurements may be received from a user input (e.g., an input to a user device such as a smartphone). In another embodiment, the human measurements may be received from a network (e.g., the Internet), for example, through a website. For example, a tailor may upload one or more measurements to a website and the system may receive the measurements. As noted, in another embodiment, the actual measurements may be used to train and/or improve the accuracy of the AI-based algorithmic results (e.g., deep learning models) results, to be discussed below. The manner of training the segmentation and annotation DLNs, and sizing ML module, is not a limitation of the present invention.

At step 208, the segmentation DLN may be trained on a body segmentation or body feature extraction. In one embodiment, the segmentation DLN may be trained using annotated human body segmentation obtained from step 204. For example, the segmentation DLN may be presented with labeled data (e.g., an image of a user and associated actual body segmentations) and may determine an error function (e.g., from a loss function, as discussed above) based on the results of the segmentation DLN and the actual body segmentation. The segmentation DLN may be trained to reduce the magnitude of this error function.

In another embodiment, the segmentation DLN may be validated by accuracy estimation techniques like a holdout method, which may split the data (e.g., all images including images having corresponding segmentations, and images on which to extract segmentations using the segmentation DLN and having no corresponding segmentations) in a training and test set (conventionally ⅔ training set and ⅓ test set designation) and may evaluate the performance of the segmentation DLN model on the test set. In another embodiment, a N-fold-cross-validation method may be used, where the method randomly splits the data into k subsets where k−1 instances of the data are used to train the segmentation DLN model while the kth instance is used to test the predictive ability of the segmentation DLN model. In addition to the holdout and cross-validation methods, a bootstrap method may be used, which samples n instances with replacement from the dataset, can be used to assess the segmentation DLN model accuracy.

At step 210, one or more annotation DLNs for each body feature may be trained, or alternatively a single annotation DLN for the entire body may be trained. For example, sixteen annotation DLNs, one for each of sixteen different body parts, may be trained. In one embodiment, the annotation DLN may be trained using the annotations obtained from step 205. For example, the annotation DLN may be presented with labeled data (e.g., an image of a body feature of a user with line annotations) and may determine an error function (e.g., from a loss function, as discussed above) based on the results of the annotation DLN and the actual annotations. The annotation DLN may be trained to reduce the magnitude of this error function.

In another embodiment, an annotation DLN may be trained specifically to generate annotation lines for a particular body feature, for example, a specific body part, such as an arm, a leg, a neck, and so on. In another embodiment, the training of the annotation DLN for each body feature may be performed in series (e.g., in a hierarchical manner, with groups of related body features being trained one after the other) or in parallel. In another embodiment, different training data sets may be used for different annotation DLNs, the different annotation DLNs corresponding to different body features or body parts. In one embodiment, there may be more or less than sixteen DLNs for the sixteen body parts, for example, depending on computational resources. In another embodiment, the training of the annotation DLNs may be performed at least partially in the cloud, to be described below.

Also, at step 210, one or more sizing ML modules for each body feature may be trained, or alternatively a single sizing ML module for the entire body may be trained. In one embodiment, the sizing ML module may be trained using the measurements obtained from step 206. For example, the sizing ML module may be presented with labeled data (e.g., an annotation line length and associated actual measurement data) and may determine an error function (e.g., from a loss function, as discussed above) based on the results of the sizing ML module and the actual measurements. The sizing ML module may be trained to reduce the magnitude of this error function.

In another embodiment, a sizing ML module may be trained specifically to extract measurements from a particular body feature, for example, a specific body part, such as an arm, a leg, a neck, and so on. In another embodiment, the training of the sizing ML module for each body feature may be performed in series (e.g., in a hierarchical manner, with groups of related body features being trained one after the other) or in parallel. In another embodiment, different training data sets may be used for different sizing ML modules, the sizing ML modules corresponding to different body features or body parts. In one embodiment, there may be more or less than sixteen sizing ML modules for the sixteen body parts, for example, depending on computational resources. In another embodiment, the training of the sizing ML modules may be performed at least partially in the cloud, to be described below.

At step 212, the trained segmentation DLN, annotation DLN, and sizing ML module to be used in FIGS. 1A, 1B, and 1C may be output. In particular, the segmentation DLN trained in step 208 is output for use in step 106 in FIG. 1A.

Similarly, the one or more annotation DLNs trained in step 210 are output for use in step 107 in FIG. 1A. Finally, the sizing ML module trained in step 210 is output for use in step 108 in FIG. 1A.

Figure 3:
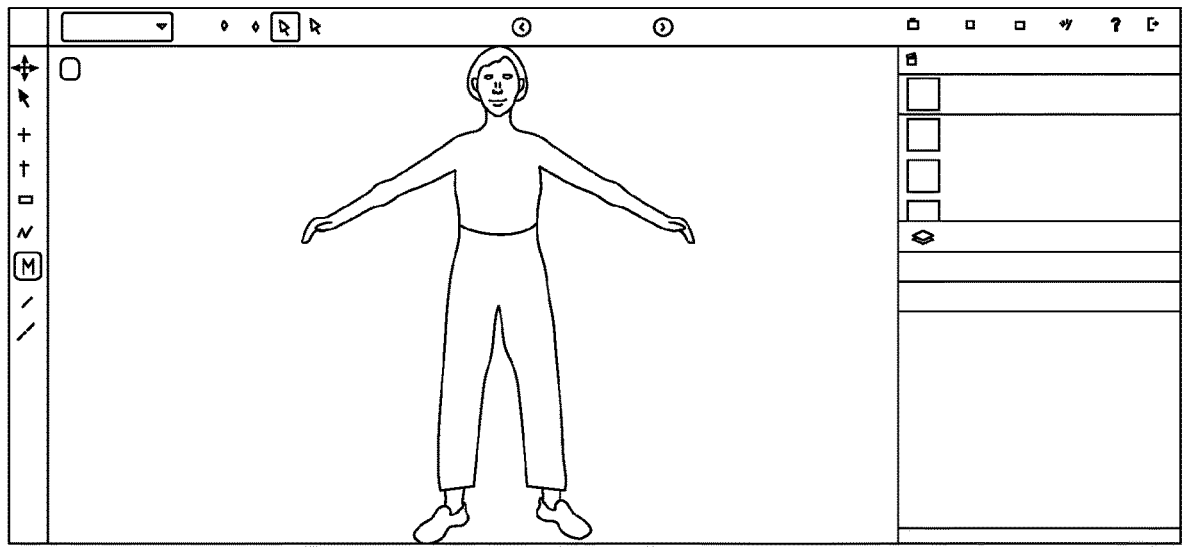
FIG. 3 shows an illustrative diagram of a user image (front view) showing a human body wearing clothes captured for training the segmentation and annotation DLNs.

FIGS. 3-6 show illustrative diagrams of a graphical user interface (GUI) corresponding to process steps in FIG. 2 that are utilized to generate training data for training the segmentation and annotation DLNs. FIG. 3 shows an illustrative diagram of a user image showing a human body wearing clothes captured for training the segmentation DLN. Although a specific user pose, the "A-pose," is shown in FIGS. 3-6, it will be understood to one of ordinary art that any pose, such as the A-pose, hands on the side, or any other pose is within the scope of the present invention. An optimal pose would clearly show legs and arms separated from the body. One advantage of the present invention is that a human can stand in almost any reasonable pose, against any type of background. The human does not need to stand against a blank background or make special arrangements for where the photos are taken.

Figure 4:
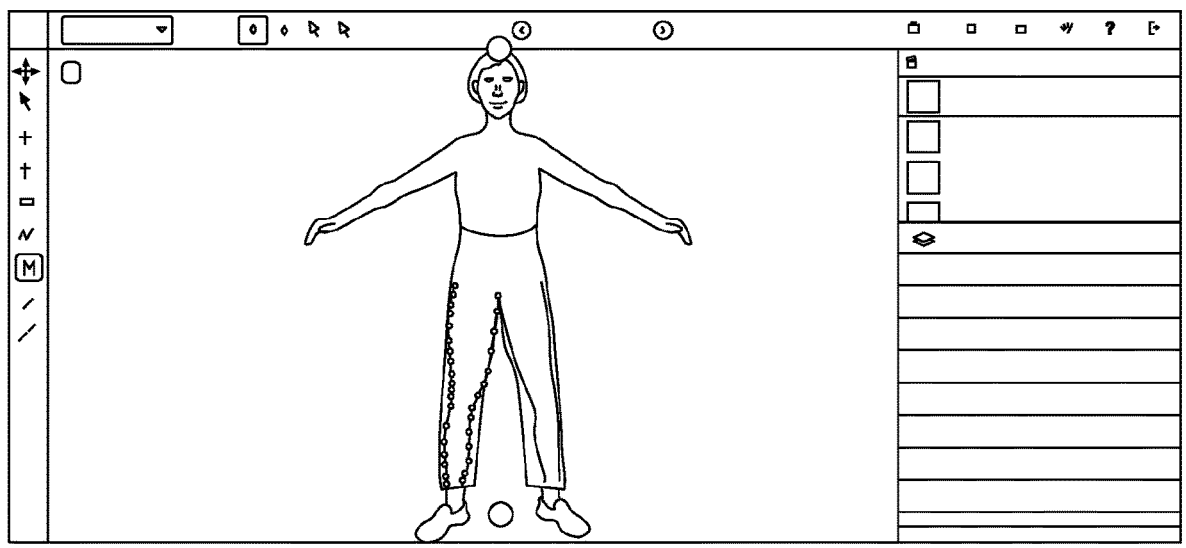
FIG. 4 shows an illustrative diagram showing an annotator manually segmenting one or more features of the human body under the clothing from the background for training the segmentation DLN.
Figure 5:
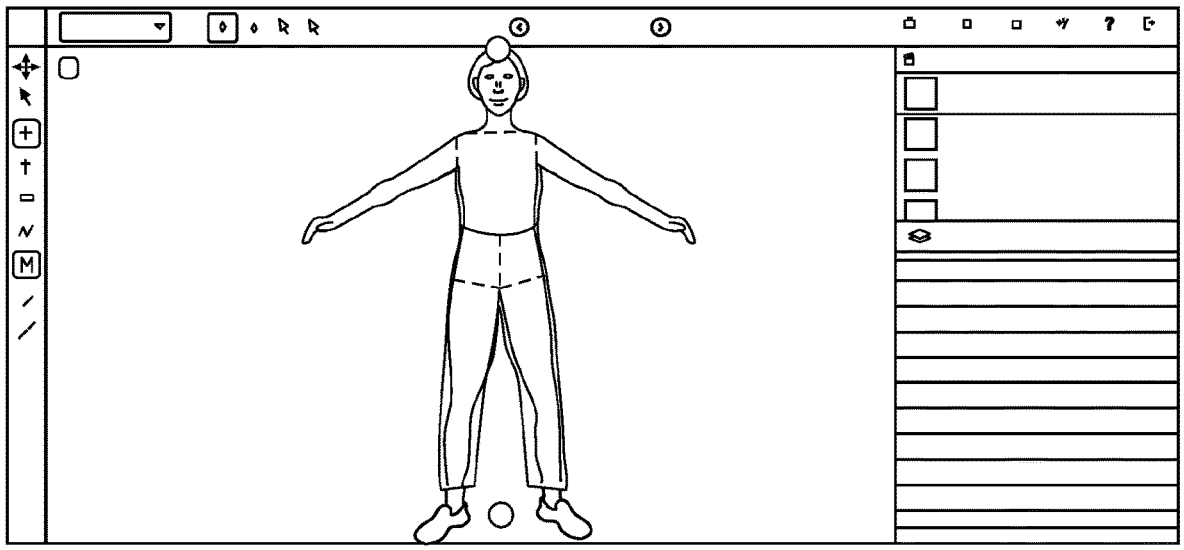
FIG. 5 shows an illustrative diagram of the body features of the human body segmented from the background for training the segmentation DLN.

FIG. 4 shows an illustrative diagram of an annotator, or operator, manually segmenting one or more features of the human body under the clothing from the background for training the segmentation DLN. In FIG. 4, the annotator is manually annotating the location of the left leg under the clothing Humans have lots of experience of seeing other humans and estimating their body shapes under the clothing, and this data is used for training the segmentation DLN to perform a similar operation automatically on new photos of unknown humans. FIG. 5 shows an illustrative diagram of the body features of the human body segmented from the background after all body features have been successfully annotated by the annotator. This data is used to train the human segmentation DLN. FIG. 5 provides the manually-annotated data that is used in training the segmentation DLN in step 208 of FIG. 2. The segmentation DLN trained in step 208 of FIG. 2, using the data obtained in FIG. 5, is then used in step 106 in FIG. 1A.

Figure 6:
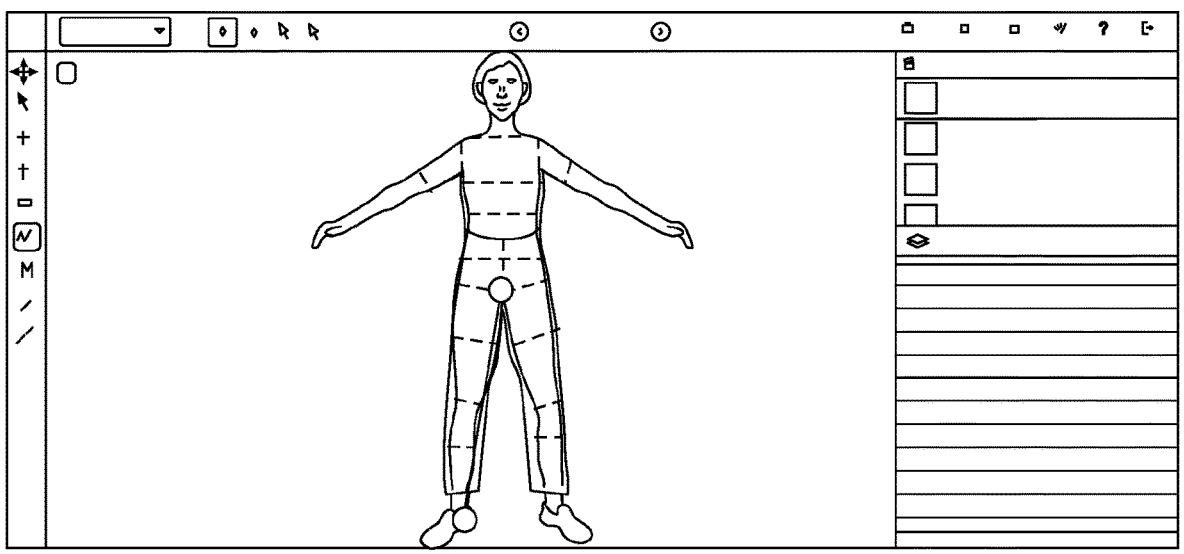
FIG. 6 shows an illustrative diagram showing the annotator manually annotating body annotation lines for training the annotation DLN.

FIG. 6 shows an illustrative diagram of the annotator manually drawing annotation lines for training the annotation DLN. This data is used to train the annotation DLN for automatically drawing annotation lines for each body feature. FIG. 6 provides the manually-annotated data that is used in training the annotation DLN in step 210 of FIG. 2. The annotation DLN trained in step 210 of FIG. 2, using the data obtained in FIG. 6, is then used in step 107 in FIG. 1A.

Although only front views are shown in FIGS. 3-6, one of ordinary skill in the art would recognize that any other orientations of views, including side views, 45 degree views, top views, and so on, are within the scope of the present invention, depending on the type of body measurement desired. For example, in one embodiment, a side view of the human is similarly segmented and annotated for use in estimating circumferences of body parts. As another example, a top photo of the top of a human head would be optimal for head measurements used to manufacture custom hats. Similarly, a front face only photo would be optimal for facial measurements used for sizing glasses, optical instruments, and so forth. A close-up photo of the front and back of a human hand can be used for sizing custom gloves, custom PPE (personal protective equipment) for the hands, custom nails, and so forth.

In one embodiment, it is also possible to deploy human beings to assist the deep-learning networks in the calculation process, analogous to directed supervised learning. A human annotator may manually adjust, or edit, a result from the segmentation DLN and/or the annotation DLNs to deliver even more accurate sizing results. The adjustment data made by the human annotator to the segmentation and annotation maps from the deep learning networks can be used in a feedback loop back into the deep learning networks to improve the DNL models automatically over time.

Alternative Deep-Learning Network (DLN) Architectures

Figure 7:
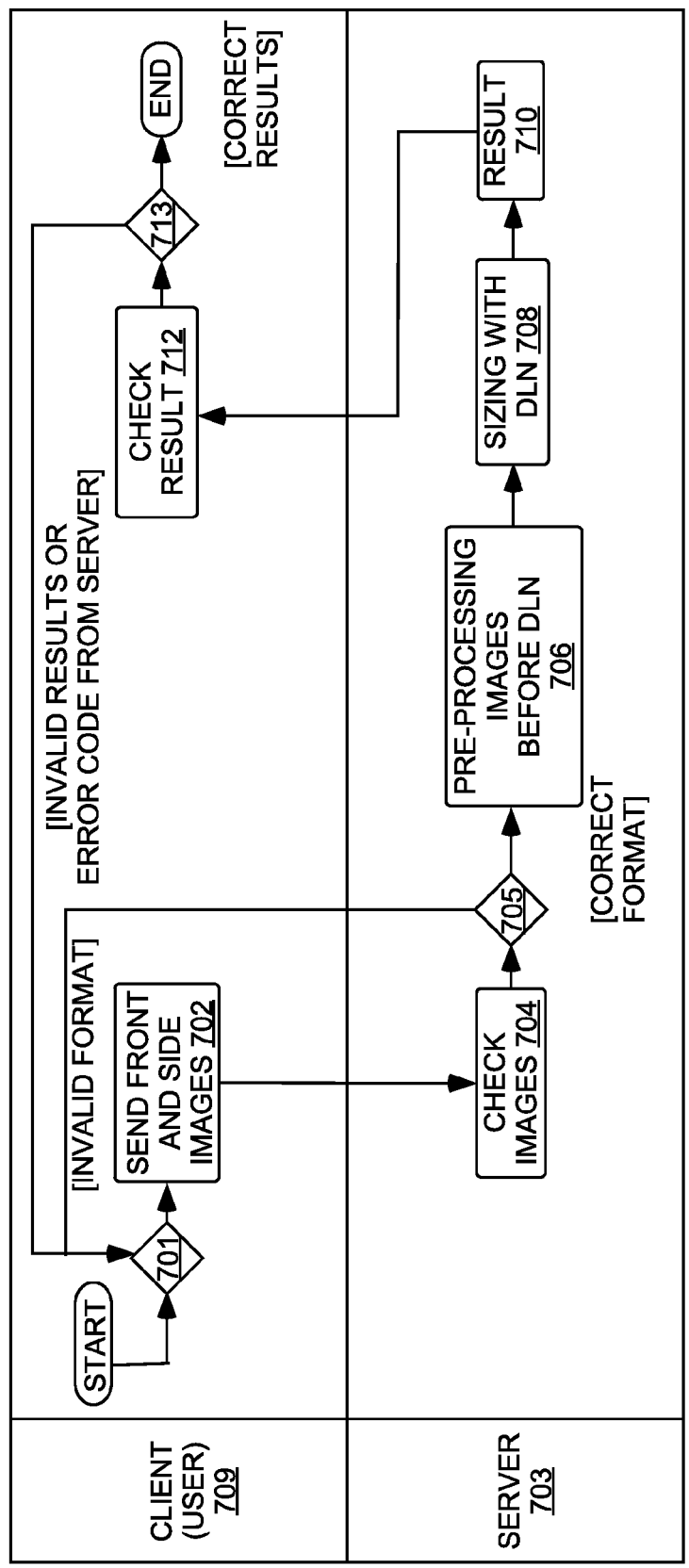
FIG. 7 shows an illustrative client-server diagram for implementing body measurement extraction, in accordance with one embodiment of the invention.

FIG. 7 shows an illustrative client-server diagram for implementing body measurement extraction, in accordance with one embodiment of the invention. The client-side (user) 709 is shown at the top, while the server-side 703 is shown at the bottom. The client-side initiates the process by sending front and side images at 702. After receiving the images, the server checks the images for the correctness of the format and other formal checks at 704. If images are not of the correct format or have other formal problems at 705, such as wrong pose, poor contrast, too far or too close, subject not in view, subject partially obstructed, and so forth, the process returns to this information to the client at 701. At 701, an error message or other communication may be displayed to the user, in one embodiment, to enable to user to retake the images.

If the images are of the correct format and have no other formal problems at 705, the images are pre-processed at 706 so that they can be handled by the DLN (deep learning network). The images are then processed through the DLN to determine sizing at 708, as described in greater detail previously. The sizing results or complete body measurements are returned at 710 from the server. The client checks the sizing results at 712. If the sizing results have any formal problems, for example being out-of-bounds, unreasonably small or large, and so on, as determined at 713, the process returns to 701, and similarly displays an error message or other communication may be displayed to the user to enable to user to retake the images. If the sizing results have no formal problems, as determined at 713, the process ends with the complete body measurements ready for use.

Figure 8:
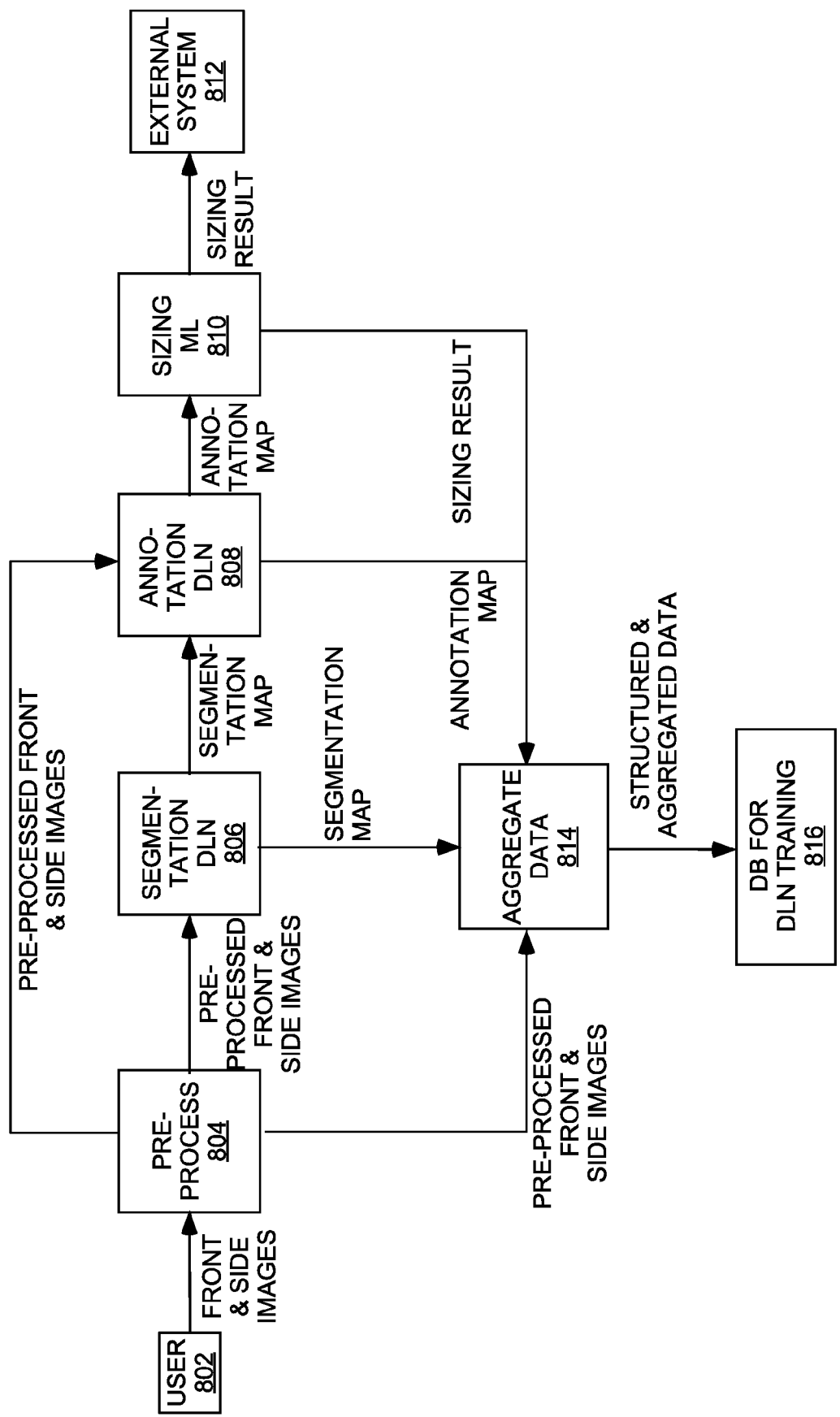
FIG. 8 shows an example flow diagram for body measurement determination (showing separate segmentation DLN, annotation DLN, and sizing machine learning module), in accordance with one embodiment of the invention.

FIG. 8 shows a diagram of one example flow diagram for body measurement determination (using separate segmentation DLN, annotation DLN, and sizing ML module), in accordance with one embodiment of the invention. In one embodiment, front and side images are received from a user at 802. The images are pre-processed at 804. As previously discussed, in some embodiments, a pre-processing on the one or more images of the user, such as a perspective correction, may be performed on the front and side view photos, if needed. For example, the system may use OpenCV, an open source machine vision library, and may make use of features of the head in the front and side view photographs and the user's height as references for perspective correction. Various computer vision techniques may be utilized to further pre-process the one or more images. Examples of pre-processing steps may include, in addition to perspective correction, contrast, lighting, and other image processing techniques to improve the quality of the one or more images before further processing.

After pre-processing, the pre-processed images are sent to the segmentation DLN at 806 to generate the segmentation map, as discussed previously. The segmentation map is aggregated with the rest of the data at 814. In parallel to the segmentation, in one embodiment, the pre-processed images are also sent to annotation DLN at 808 to generate the annotation measurement lines, as discussed previously. The annotation map is aggregated with the rest of the data at 814. The annotation map is provided, in one embodiment, to sizing machine learning (ML) module 810 to generate the body feature measurements for each body feature that has been segmented and annotated by measuring each annotation line, as discussed previously. The sizing result is aggregated with the rest of the data at 814. The sizing result is output to one or more external system(s) for various uses as described herein at 812. Finally, all of the aggregated and structured data, (1) the pre-processed front and side images, (2) the segmentation map, (3) the annotation map, and (4) the sizing result, that have been aggregated at 814 are stored in a database for further DLN training at 1016.

Figure 9:
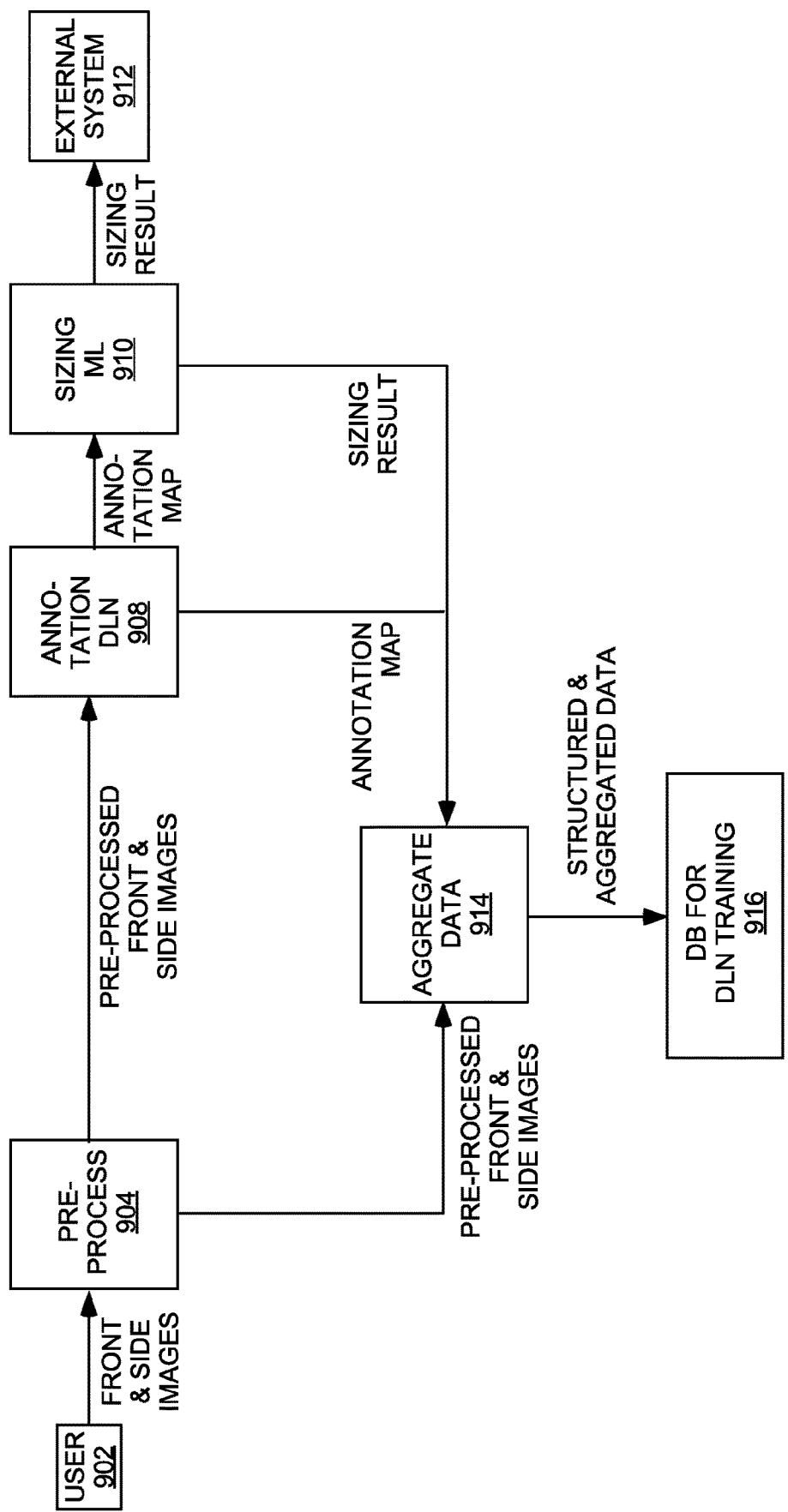
FIG. 9 shows another example flow diagram for body measurement determination (showing combined segmentation-annotation DLN and sizing machine learning module), in accordance with another embodiment of the invention.

FIG. 9 shows a diagram of another example flow diagram for body measurement determination (using a combined segmentation-annotation DLN and sizing ML module), in accordance with another embodiment of the invention. Front and side images are received from a user at 902, and the images are pre-processed at 904, as previously discussed. Examples of pre-processing steps include perspective correction, contrast, lighting, and other image processing techniques to improve the quality of the one or more images before further processing.

After pre-processing, the pre-processed images are sent directly to the annotation DLN at 918 to generate the annotation map, as discussed previously. Instead of first performing body feature segmentation, in this alternative embodiment, the annotation lines are drawn directly on the images without explicitly segmenting the body features from the background using a specially-trained combined segmentation-annotation DLN that effectively combines the features of both the segmentation DLN and the annotation DLN (shown in the embodiment in FIG. 8) into a single annotation DLN shown in FIG. 9. In effect, the body feature segmentation is performed implicitly by the annotation DLN. The annotation map is aggregated with the rest of the data at 914.

The annotation map is provided, in one embodiment, to sizing machine learning (ML) module 910 to generate the body feature measurements for each body feature that has been annotated by measuring each annotation line, as discussed previously. The sizing result is aggregated with the rest of the data at 914. The sizing result is output to one or more external system(s) for various uses as described herein at 912. Finally, all of the aggregated and structured data, (1) the pre-processed front and side images, (2) the annotation map, and (3) the sizing result, that have been aggregated at 914 are stored in a database for further DLN training at 916.

Figure 10:
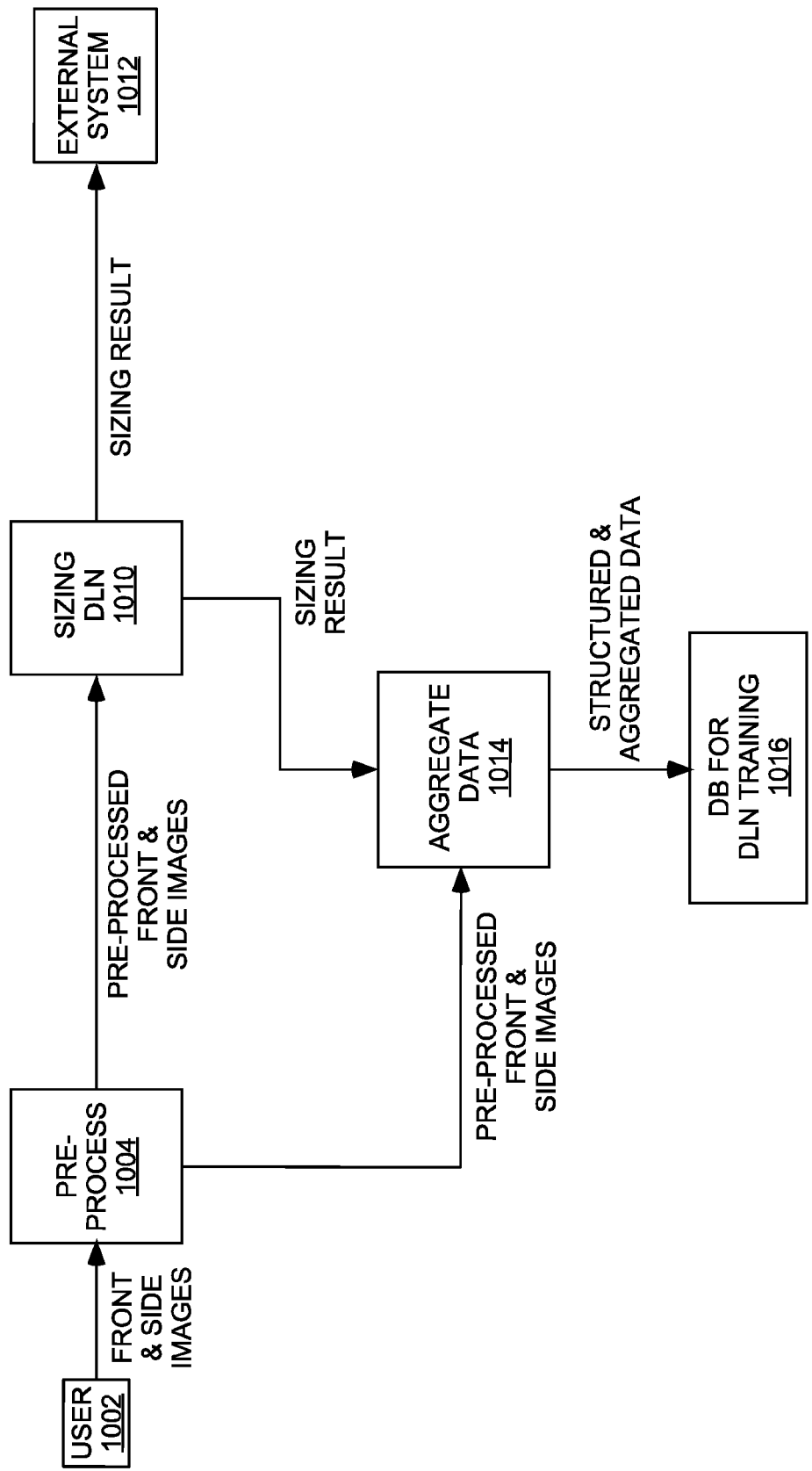
FIG. 10 shows yet another example flow diagram for body measurement determination (showing a combined sizing DLN), in accordance with yet another embodiment of the invention.

FIG. 10 shows a diagram of yet another example flow diagram for body measurement determination (using a combined sizing DLN), in accordance with yet another embodiment of the invention. Front and side images are received from a user at 1002, and the images are pre-processed at 1004, as previously discussed. Examples of pre-processing steps include perspective correction, contrast, lighting, and other image processing techniques to improve the quality of the one or more images before further processing.

After pre-processing, the pre-processed images are sent directly to the sizing DLN at 1010 to generate the complete body feature measurements, as discussed previously. Instead of first performing body feature segmentation and annotation of the measurement lines, followed by measurement of the lines, in this alternative embodiment, the body feature are directly extracted from the pre-processed images without explicitly segmenting the body features from the background (and without explicitly drawing the annotation lines) using a specially-trained sizing DLN that effectively combines the features of the segmentation DLN, the annotation DLN, and the measurement machine learning modules (shown in the embodiment shown in FIG. 8) into a single sizing DLN shown in FIG. 10. In effect, the body feature segmentation and the annotation of the measurement lines is performed implicitly by the sizing DLN.

The sizing result is aggregated with the rest of the data at 1014. The sizing result is output to one or more external system(s) for various uses as described herein at 1012. Finally, all of the aggregated and structured data, (1) the pre-processed front and side images and (2) the sizing result, that has been aggregated at 1014 are stored in a database for further DLN training at 1016.

3D Model and Skeleton/Joint Position Model Embodiments

Figure 11:
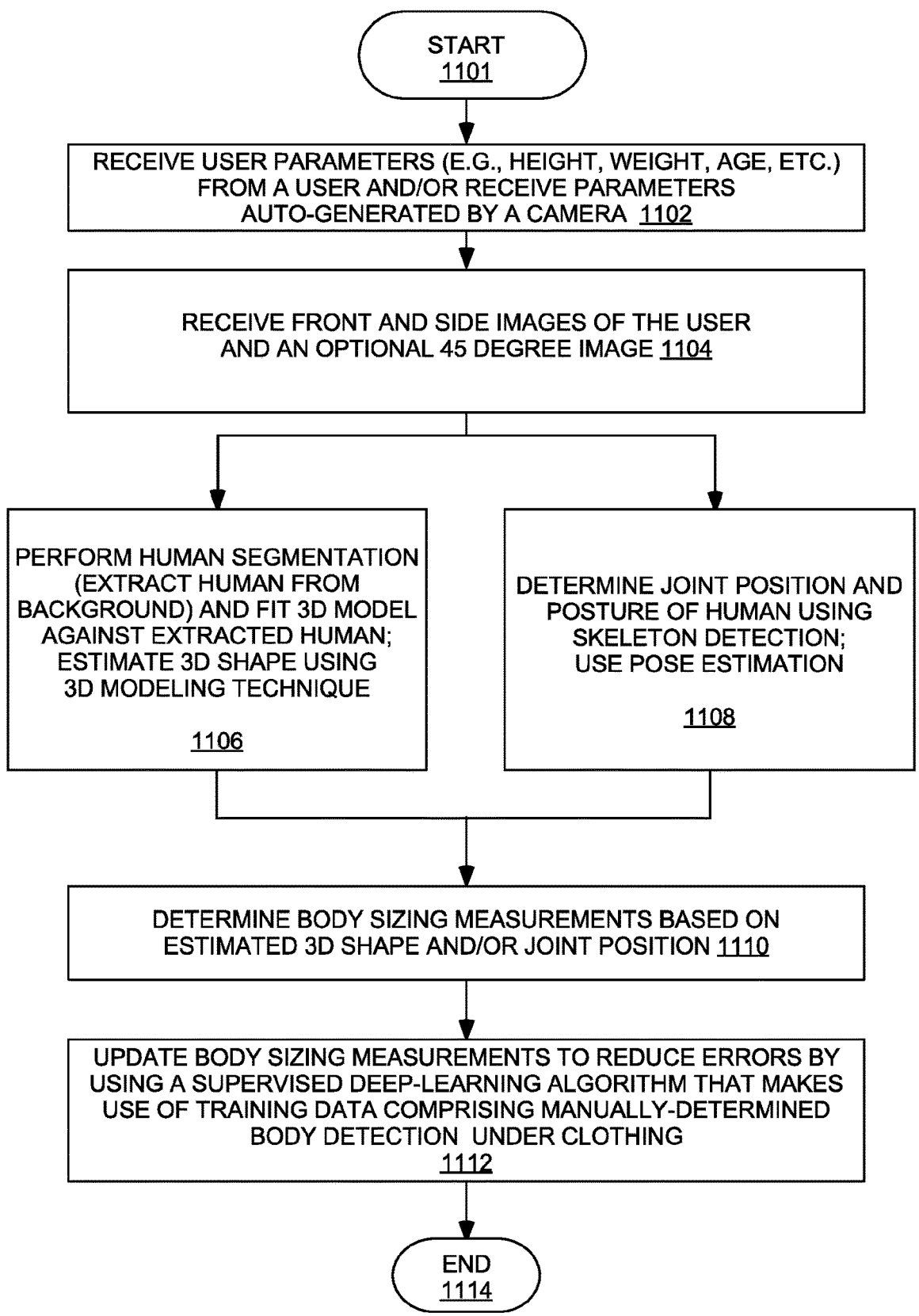
FIG. 11 shows another example flow diagram for body measurement determination (showing 3D human model and skeleton-joint position model), in accordance with another illustrative embodiment of the disclosure.

FIG. 11 shows a diagram of another example process flow for body measurement determination operations, in accordance with example embodiments of the disclosure. The process begins at step 1101. At step 1102, user parameters (e.g., height, weight, demographics, athleticism, and the like) may be received from a user and/or receive parameters auto-generated by a phone camera. In additional aspects, user parameters may be determined automatically (e.g., using computer vision algorithms or mined from one or more databases), or determined from the user (e.g., user input). In another embodiment, from these parameters, a body mass index (BMI) may be calculated. As noted, the BMI (or any other parameter determined above) may be used to calibrate the body weight to height.

At step 1104, images of the user (e.g., first and second images representing a full-body front and a side view of the user) may be received, and an optional third image may be received (for example, a 45-degree view between the front and the side view, which may be used to enhance the accuracy of the subsequent algorithms). In another embodiment, the images may be obtained from the user device (e.g., mobile phone, laptop, tablet, etc.). In another embodiment, the images may be determined from a database (e.g., a social media database). In another embodiment, the user may indicate whether he or she is dressed in tight, normal, or loose clothing for more accurate results. In some optional embodiments, as described above, a perspective correction may be performed on the front and side view photos, if needed.

At step 1106, a human segmentation (e.g., an extraction of the human from a background of the images) may be performed, and a 3D model may be fitted against an extracted human. Moreover, a three-dimensional shape may be estimated using a three-dimensional modeling technique. In one embodiment, the system may utilize deep learning techniques and/or OpenCV to extract the human body, including clothing, from the background. Before performing this step on data from a real user, the system may have been trained first, for example, on sample photos of humans posing in different environments in different clothing, with hands at 45 degrees ("A-pose").

At step 1108, a joint position and posture of the human may be determined using skeleton detection; further, the determination may be performed using a pose estimation algorithm such as OpenPose, an open source algorithm, for pose detection. In one embodiment, body pose estimation may include algorithms and systems that recover the pose of an articulated body, which consists of joints and rigid parts using image-based observations. In another embodiment, OpenPose may include a real-time multi-person system to jointly detect human body, hand, facial, and foot keypoints (in total 135 keypoints) on single images. In one embodiment, a keypoint may refer to a part of a person's pose that is estimated, such as the nose, right ear, left knee, right foot, etc. The keypoint contains both a position and a keypoint confidence score. Further aspects of OpenPose functionality include, but not be limited to, 2D real-time multi-person keypoint body estimation. The functionality may further include the ability for the algorithms to be run-time invariant to number of detected people. Another aspect of its functionality may include, but may not be limited to, 3D real-time single-person keypoint detection, including 3D triangulation from multiple single views.

At step 1110, body sizing measurements may be determined based on estimated three-dimensional shape, joint position and/or posture. In another embodiment, the system may determine the sizes of the body parts using inputs of height, weight, and/or other parameters (e.g., BMI index, age, gender, etc.). In one embodiment, the system may use, in part, a Virtuoso algorithm, an algorithm providing standard DaVinci models of human body parts and relative sizes of body parts.

Further, the system may generate and extract body measurements by using an AI-based algorithm such as a DLN algorithm, as described above, for example, by drawing measurement lines from signals obtained from skeleton points. In particular, the system may look at one or more skeleton points, calculate bone angled against the edge of the user's body and draw measurement lines in certain orientations or directions. Each measurement line may be different for each body part and may be drawn differently. The system may also use other algorithms, means, medians, and other resources.

Further, the body measurements may be outputted to a user device and/or a corresponding server. In one embodiment, the output may be in the form of a text message, an email, a textual description on a mobile application or website, combinations thereof, and the like.

At step 1112, the body sizing measurements may be updated to reduce errors by using a supervised deep-learning algorithm that makes use of training data, the training data comprising manually-determined body detection underneath clothing. In some aspects, any suitable deep learning architecture may be used such as deep neural networks, deep belief networks and recurrent neural networks, as described above. In one embodiment, training data may be obtained from annotator input that extracts a human body from a given photo, excluding clothing, from a background of the photos, as described above. Further, at least a portion of such annotated images may be used as training data that may be fed to the deep learning networks so that the GPU can learn from outlines of humans wearing clothes in any background. In short, the deep learning approaches described above may be used, in some embodiments, in combination to improve the accuracy and reliability of the 3D model and skeleton/joint position approaches.

Hardware, Software, and Cloud Implementation of the Present Invention

As discussed, the data (e.g., photos, textual descriptions, and the like) described throughout the disclosure can include data that is stored on a database stored or hosted on a cloud computing platform. It is to be understood that although this disclosure includes a detailed description on cloud computing, below, implementation of the teachings recited herein are not limited to a cloud computing environment. Rather, embodiments of the present invention are capable of being implemented in conjunction with any other type of computing environment now known or later developed.

Cloud computing can refer to a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics may include one or more of the following. On-demand self-service: a cloud consumer can unilaterally provision computing capabilities, such as server time and network storage, as needed automatically without requiring human interaction with the service's provider. Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time. Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

In another embodiment, Service Models may include the one or more of the following. Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including networks, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models may include one or more of the following. Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

The cloud computing environment may include one or more cloud computing nodes with which local computing devices used by cloud consumers, such as, for example, personal digital assistant (PDA) or cellular telephone, desktop computer, laptop computer, and/or automobile computer system can communicate. Nodes can communicate with one another. They can be group physically or virtually, in one or more networks, such as Private, Community, Public, or Hybrid clouds as described hereinabove, or a combination thereof. This allows cloud computing environment to offer infrastructure, platforms and/or software as services for which a cloud consumer does not need to maintain resources on a local computing device. It is understood that the types of computing devices are intended to be exemplary only and that computing nodes and cloud computing environment can communicate with any type of computerized device over any type of network and/or network addressable connection (e.g., using a web browser).

Figure 12:
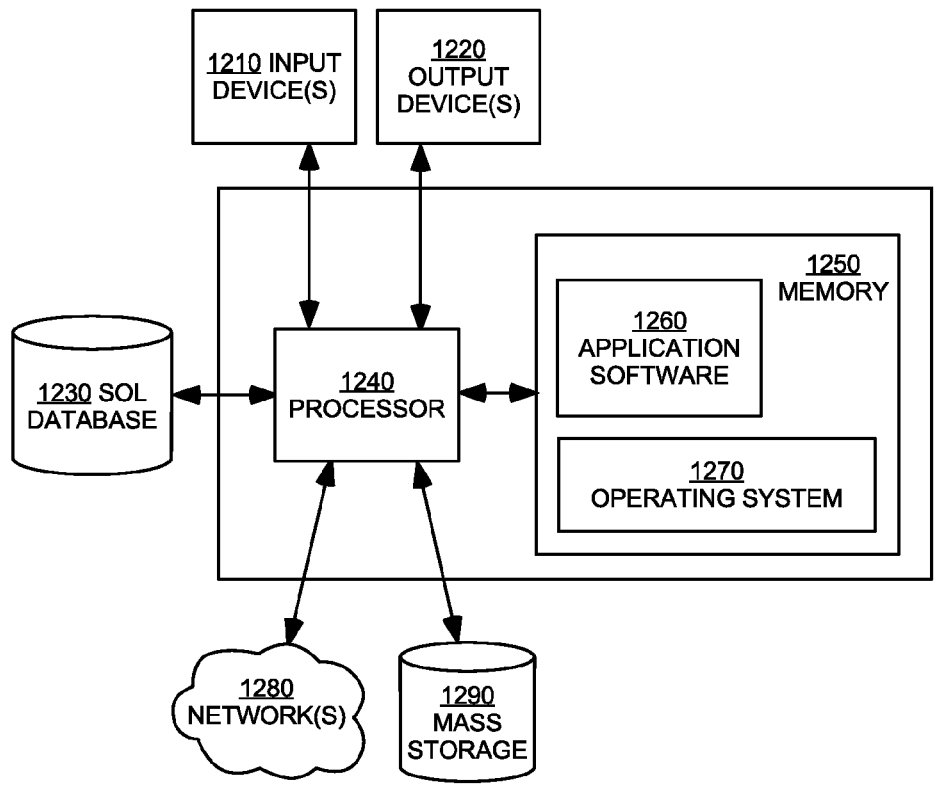
FIG. 12 shows an illustrative hardware architecture diagram of a server for implementing one embodiment of the present invention.

The present invention may be implemented using server-based hardware and software. FIG. 12 shows an illustrative hardware architecture diagram of a server for implementing one embodiment of the present invention. Many components of the system, for example, network interfaces etc., have not been shown, so as not to obscure the present invention. However, one of ordinary skill in the art would appreciate that the system necessarily includes these components. A user-device is a hardware that includes at least one processor 1240 coupled to a memory 1250. The processor may represent one or more processors (e.g., microprocessors), and the memory may represent random access memory (RAM) devices comprising a main storage of the hardware, as well as any supplemental levels of memory e.g., cache memories, non-volatile or back-up memories (e.g. programmable or flash memories), read-only memories, etc. In addition, the memory may be considered to include memory storage physically located elsewhere in the hardware, e.g. any cache memory in the processor, as well as any storage capacity used as a virtual memory, e.g., as stored on a mass storage device.

The hardware of a user-device also typically receives a number of inputs 1210 and outputs 1220 for communicating information externally. For interface with a user, the hardware may include one or more user input devices (e.g., a keyboard, a mouse, a scanner, a microphone, a web camera, etc.) and a display (e.g., a Liquid Crystal Display (LCD) panel). For additional storage, the hardware my also include one or more mass storage devices 1290, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the hardware may include an interface one or more external SQL databases 1230, as well as one or more networks 1280 (e.g., a local area network (LAN), a wide area network (WAN), a wireless network, and/or the Internet among others) to permit the communication of information with other computers coupled to the networks. It should be appreciated that the hardware typically includes suitable analog and/or digital interfaces to communicate with each other.

The hardware operates under the control of an operating system 1270, and executes various computer software applications 1260, components, programs, codes, libraries, objects, modules, etc. indicated collectively by reference numerals to perform the methods, processes, and techniques described above.

Figure 13:
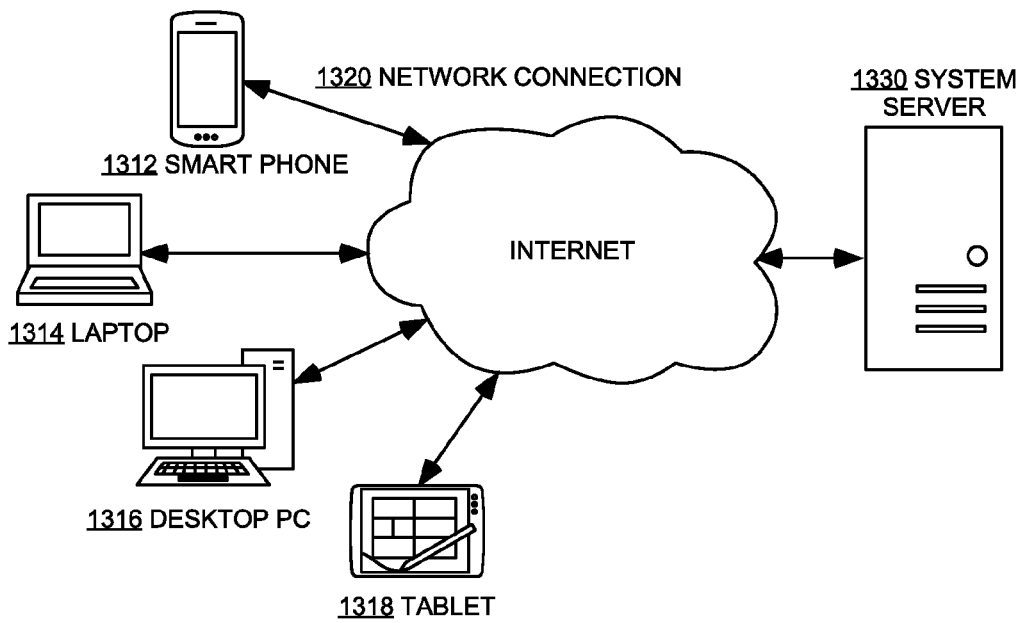
FIG. 13 shows an illustrative system architecture diagram for implementing one embodiment of the present invention in a client server environment.

The present invention may be implemented in a client server environment. FIG. 13 shows an illustrative system architecture for implementing one embodiment of the present invention in a client server environment. User devices 1310 on the client side may include smart phones 1312, laptops 1314, desktop PCs 1316, tablets 1318, or other devices. Such user devices 1310 access the service of the system server 1330 through some network connection 1320, such as the Internet.

In some embodiments of the present invention, the entire system can be implemented and offered to the end-users and operators over the Internet, in a so-called cloud implementation. No local installation of software or hardware would be needed, and the end-users and operators would be allowed access to the systems of the present invention directly over the Internet, using either a web browser or similar software on a client, which client could be a desktop, laptop, mobile device, and so on. This eliminates any need for custom software installation on the client side and increases the flexibility of delivery of the service (software-as-a-service), and increases user satisfaction and ease of use. Various business models, revenue models, and delivery mechanisms for the present invention are envisioned, and are all to be considered within the scope of the present invention.

In general, the method executed to implement the embodiments of the invention, may be implemented as part of an operating system or a specific application, component, program, object, module or sequence of instructions referred to as "computer program(s)" or "computer code(s)." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), and digital and analog communication media.

Example Use Cases of the Present Invention

Figure 14:
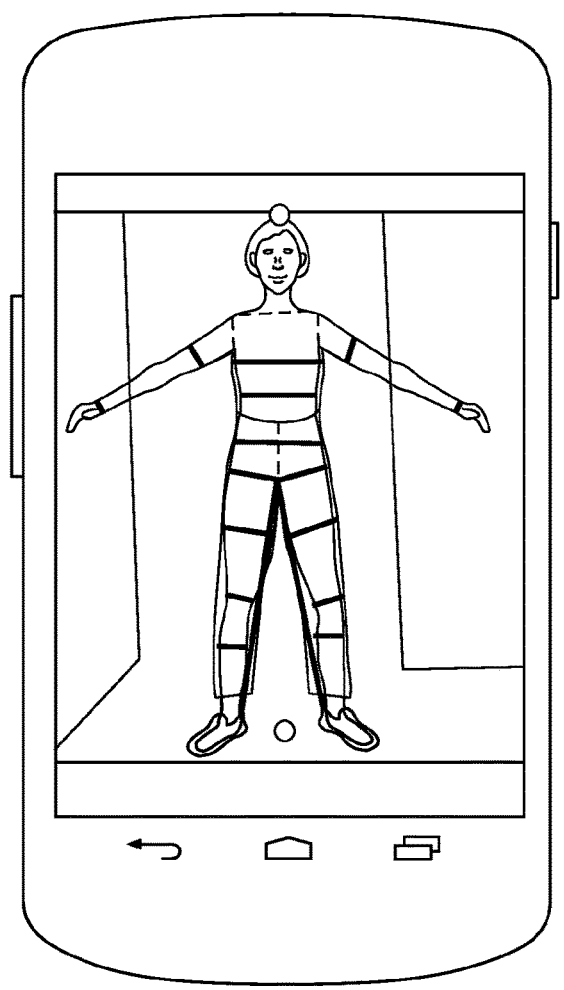
FIG. 14 shows an illustrative diagram of a use case of the present invention in which a single camera on a mobile device is used to capture human body measurements, showing a front view of a human in typical clothing standing against a normal background.

FIG. 14 is an illustrative diagram of a use case of the present invention in which a single camera on a mobile device is used to capture human body measurements, showing a front view of a human in typical clothing standing against a normal background. The mobile device shown in FIG. 14 comprises at least one camera, a processor, a non-transitory storage medium, and a communication link to a server. In one embodiment, the one or more photos of the user's body are transmitted to a server that performs the operations described herein. In one embodiment, the one or more photos of the user's body are analyzed locally by the processor of the mobile device. The operations performed return one or more body measurements, which may be stored on the server, as well as presented to the user. In addition, the body measurements may then be utilized for many purposes, including but not limited to, offering for sale to the user one or more custom garments, custom glasses, custom gloves, custom body suites, custom PPE (personal protection equipment), custom hats, custom diet regiments, custom exercise, gym, and workout routines, and so on. Without loss of generality, the body measurements may be output, transmitted, and/or utilized for any purpose for which body measurements are useful.

Figure 15:
FIG. 15 shows an illustrative diagram of a mobile device graphical user interface (GUI) showing user instructions for capturing a front view photo, according to one embodiment of the present invention.

Finally, FIGS. 15-21 show illustrative mobile graphical user interfaces (GUIs) in which some embodiments of the present invention have been implemented. FIG. 15 shows an illustrative diagram of the mobile device GUI showing user instructions for capturing a front view photo, according to one embodiment of the present invention. FIG. 16 shows an illustrative diagram of the mobile device GUI requesting the user to enter their height (and optionally other demographic information, such as weight, age, etc.) and to select their preferred fit style (tight, regular, or loose fit.), according to one embodiment of the present invention. FIG. 17 shows an illustrative diagram of the mobile device GUI for capturing the front view photo, according to one embodiment of the present invention. FIG. 18 shows another illustrative diagram of the mobile device GUI for capturing the front view photo with an illustrative A-pose shown in dotted lines, according to one embodiment of the present invention. FIG. 19 shows an illustrative diagram of the mobile device GUI for capturing the side view photo, according to one embodiment of the present invention. FIG. 20 shows an illustrative diagram of the mobile device GUI that is displayed while the system processes the photos to extract the body measurements, according to one embodiment of the present invention. Lastly, FIG. 21 shows an illustrative diagram of the mobile device GUI showing a notification screen when the body measurements have been successfully extracted, according to one embodiment of the present invention.

The present invention has been successfully implemented resulting in sub 1 cm accuracy body measurements relative to a human tailor. The system is able to use just two photos and achieve accuracy comparable to a human tailor. The system does not require the use of any specialized hardware sensors, does not require the user to stand against any special background, does not require special lighting, can be used with photos taken at any distance, and with the user wearing any type of clothing. The result is a body measurement system that works with any mobile device so that anyone can easily take photos of themselves and benefit from automatic full body measurement extraction.

One of ordinary skill in the art knows that the use cases, structures, schematics, and flow diagrams may be performed in other orders or combinations, but the inventive concept of the present invention remains without departing from the broader scope of the invention. Every embodiment may be unique, and methods/steps may be either shortened or lengthened, overlapped with the other activities, postponed, delayed, and continued after a time gap, such that every user is accommodated to practice the methods of the present invention.

Although the present invention has been described with reference to specific exemplary embodiments, it will be evident that the various modification and changes can be made to these embodiments without departing from the broader scope of the invention. Accordingly, the specification and drawings are to be regarded in an illustrative sense rather than in a restrictive sense. It will also be apparent to the skilled artisan that the embodiments described above are specific examples of a single broader invention which may have greater scope than any of the singular descriptions taught. There may be many alterations made in the descriptions without departing from the scope of the present invention.

What is claimed is:

1. A computer-implemented method for generating body size measurements of a human, the computer-implemented method executable by a hardware processor, the method comprising:

receiving one or more user parameters;

receiving at least one image containing the human and a background;

identifying one or more body features associated with the human;

performing body feature annotation on the identified body features for generating an annotation line on each body feature corresponding to a body feature measurement, the body feature annotation utilizing an annotation deep-learning network that has been trained on annotation training data, the annotation training data comprising one or more images for one or more sample body features and an annotation line for each body feature;

generating body feature measurements from the one or more annotated body features utilizing a sizing machine-learning module based on the annotated body features and the one or more user parameters; and generating body size measurements by aggregating the body feature measurements for each body feature.

2. A computer program product for generating body size measurements of a human, comprising a non-transitory computer readable storage medium having program instructions embodied therein, the program instructions executable by a processor to cause the processor to:

receive one or more user parameters;

receive at least one image containing the human and a background;

identify one or more body features associated with the human;

perform body feature annotation on the extracted body features for generating an annotation line on each body feature corresponding to a body feature measurement, the body feature annotation utilizing an annotation deep-learning network that has been trained on annotation training data, wherein the annotation training data comprise one or more images for one or more sample body features and an annotation line for each body feature;

generate body feature measurements from the one or more annotated body features utilizing a sizing machine-learning module based on the annotated body features and the one or more user parameters; and generate body size measurements by aggregating the body feature measurements for each body feature.

3. The computer program product of claim 2, wherein the identifying the one or more body features associated with the human comprises program instructions to:

perform body segmentation on the at least one image to identify the one or more body features associated with the human from the background, wherein the body segmentation utilizes a segmentation deep-learning network that has been trained on segmentation training data, and wherein the segmentation training data comprise one or more images for one or more sample humans and a body feature segmentation for each body feature for the one or more sample humans.

4. The computer program product of claim 3, wherein the body feature segmentation is extracted underneath clothing, and wherein the segmentation training data comprises body segmentation estimating the human's body underneath the clothing by an annotator.

5. The computer program product of claim 3, wherein the performing the body segmentation on the at least one image further comprises receiving user input to increase an accuracy of the body segmentation, and wherein the user input comprises a user selection of one or more portions of the body features that correspond to a given region of the human's body.

6. The computer program product of claim 2, wherein the annotation line on each body feature comprises one or more line segments corresponding to a given body feature measurement, and wherein the generating the body feature measurements from the one or more annotated body features utilizes the annotation line on each body feature.

7. The computer program product of claim 2, wherein the at least one image comprises at least a front-view image and a side-view image of the human, and wherein the program instructions further cause the processor to:

calculate at least one circumference of at least one annotated body feature utilizing line-annotated front-view and side-view images and a height of the human; and generate the body feature measurements from the at least one circumference utilizing the sizing machine-learning module based on the at least one circumference, the height, and the one or more user parameters.

8. The computer program product of claim 2, wherein the sizing machine-learning module comprises a random forest algorithm, and wherein the sizing machine-learning module is trained on ground truth data comprising one or more sample body size measurements for one or more sample humans.

9. The computer program product of claim 2, wherein the one or more user parameters are selected from the group consisting of a height, a weight, a gender, an age, and a demographic information.

10. The computer program product of claim 2, wherein the program instructions to receive the one or more user parameters comprise program instructions to receive user input of the one or more user parameters through a user device.

11. The computer program product of claim 2, wherein the program instructions to receive the one or more user parameters comprise program instructions to receive a measurement performed by a user device.

12. The computer program product of claim 2, wherein the at least one image is selected from the group consisting of a front-view image of the human and a side-view image of the human.

13. The computer program product of claim 12, wherein the at least one image further comprises an additional image of the human taken at an angle of 45 degrees with respect to the front-view image of the human.

14. The computer program product of claim 2, wherein the at least one image comprises at least one image of a fully-clothed user or a partially-clothed user, and wherein the generating body feature measurements further comprises generating the body feature measurements on the at least one image of the fully-clothed user or the partially-clothed user.

15. The computer program product of claim 2, wherein the body size measurements comprise first body size measurements, wherein the program instructions further comprise program instructions to generate second body size measurements using a second sizing machine-learning module, and wherein an accuracy of the second body size measurements is greater than an accuracy of the first body size measurements.

16. The computer program product of claim 2, further comprising program instructions to:

determine whether a given body feature measurement of the body features corresponds to a confidence level below a predetermined value; and in response to determining that the given body feature measurement corresponds to a confidence level below the predetermined value, perform 3D model matching using a 3D model matching module on the body features to determine a matching 3D model of the human, wherein one or more high-confidence body feature measurements are used to guide the 3D model matching module, perform body feature measurements based on the matching 3D model, and replace the given body feature measurement with a projected body feature measurement from the matching 3D model.

17. The computer program product of claim 2, further comprising program instructions to:

determine whether a given body feature measurement of the body features corresponds to a confidence level below a predetermined value; and in response to determining that the given body feature measurement corresponds to a confidence level below the predetermined value, perform skeleton detection using a skeleton detection module on the body features to determine joint positions of the human, wherein one or more high-confidence body feature measurements are used to guide the skeleton detection module, perform body feature measurement based on the determined joint positions, and replace the given body feature measurement with a projected body feature measurement from the skeleton detection module.

18. The computer program product of claim 2, further comprising program instructions to: pre-process the at least one image of the human and the background before performing body segmentation.

19. The computer program product of claim 18, wherein the pre-processing comprises at least a perspective correction on the at least one image.

20. The computer program product of claim 2, wherein the program instructions comprise additional program instructions to:
- generate a segmentation map of the body features on the human; and
- crop the one or more identified body features from the human and the background before performing the body feature annotation,
- wherein performing the body feature annotation utilizes a plurality of annotation deep-learning networks that have been separately trained on each body feature.

* * * * *